United States Patent
Imamura et al.

(10) Patent No.: US 9,144,058 B2
(45) Date of Patent: Sep. 22, 2015

(54) MULTI-MODE PHASE ROTATION APPARATUS THAT TRANSMITS CQI DEPENDING ON THE MODE USED

(71) Applicant: Sharp Kabushiki Kaisha, Osaka-shi, Osaka (JP)

(72) Inventors: Kimihiko Imamura, Osaka (JP); Ryota Yamada, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 13/913,299

(22) Filed: Jun. 7, 2013

(65) Prior Publication Data

US 2013/0294217 A1 Nov. 7, 2013

Related U.S. Application Data

(63) Continuation of application No. 12/092,048, filed as application No. PCT/JP2006/321734 on Oct. 31, 2006, now Pat. No. 8,483,304.

(30) Foreign Application Priority Data

Oct. 31, 2005 (JP) ................................. 2005-317266

(51) Int. Cl.
H04B 7/02 (2006.01)
H04W 72/04 (2009.01)
(Continued)

(52) U.S. Cl.
CPC .............. H04W 72/04 (2013.01); H04B 7/0452 (2013.01); H04B 7/0689 (2013.01); H04B 7/12 (2013.01);

(Continued)

(58) Field of Classification Search
CPC ..... H04L 5/0023; H04L 1/06; H04L 27/2601; H04L 2025/03426; H04L 2025/03414; H04L 5/0094; H04L 5/0057; H04B 7/0671; H04B 7/0413; H04B 7/12; H04B 7/0608; H04B 7/04; H04B 7/0452; H04B 7/0602
USPC .......... 375/260, 267, 299, 347, 349; 370/208, 370/330, 204, 334; 455/101, 132, 103, 102
See application file for complete search history.

(56) References Cited

U.S. PATENT DOCUMENTS

| 4,856,025 A | 8/1989 | Takai |
| 5,991,331 A | 11/1999 | Chennakeshu et al. |

(Continued)

FOREIGN PATENT DOCUMENTS

| CN | 1320308 A | 10/2001 |
| CN | 1338162 A | 2/2002 |

(Continued)

OTHER PUBLICATIONS

"Physical Channels and Multiplexing in Evolved UTRA Downlink", NTT, R1-050707, 3GPP TSG RAN WG1 Meeting #42 on LTE, Aug. 29, 2005, London, UK.

(Continued)

Primary Examiner — Rahel Guarino
(74) Attorney, Agent, or Firm — Birch, Stewart, Kolasch & Birch, LLP

(57) ABSTRACT

A terminal apparatus and a communication method thereof, where the terminal apparatus receives, from a base station, signals based on a mode which is selected either a first mode to be capable of applying a phase rotation difference to signals between adjacent subcarriers at least in a transmitting antenna or a second mode not to be capable of applying the phase rotation difference; and transmits a Channel Quality Indicator (CQI) depending on the mode selected.

8 Claims, 28 Drawing Sheets

(51) Int. Cl.
*H04L 27/26* (2006.01)
*H04B 7/12* (2006.01)
*H04L 5/00* (2006.01)
*H04L 25/03* (2006.01)
*H04B 7/04* (2006.01)
*H04B 7/06* (2006.01)

(52) U.S. Cl.
CPC .......... *H04L 5/0057* (2013.01); *H04L 27/2601* (2013.01); *H04B 7/04* (2013.01); *H04B 7/0413* (2013.01); *H04B 7/0602* (2013.01); *H04B 7/0608* (2013.01); *H04B 7/0671* (2013.01); *H04L 5/0023* (2013.01); *H04L 5/0094* (2013.01); *H04L 2025/03414* (2013.01); *H04L 2025/03426* (2013.01)

(56) References Cited

U.S. PATENT DOCUMENTS

| | | | |
|---|---|---|---|
| 6,034,987 | A | 3/2000 | Chennakeshu et al. |
| 6,131,016 | A | 10/2000 | Greenstein et al. |
| 6,249,250 | B1 | 6/2001 | Namekata et al. |
| 6,650,910 | B1 | 11/2003 | Mazur et al. |
| 6,731,619 | B1 | 5/2004 | Ramesh et al. |
| 6,807,145 | B1 | 10/2004 | Weerackody et al. |
| 6,842,487 | B1 | 1/2005 | Larsson |
| 6,862,456 | B2 | 3/2005 | Sugar et al. |
| 6,892,059 | B1 | 5/2005 | Kim et al. |
| 6,980,612 | B1 | 12/2005 | Miyoshi |
| 7,002,939 | B1 | 2/2006 | Hiramatsu |
| 7,065,156 | B1 | 6/2006 | Kuchi |
| 7,277,469 | B2 | 10/2007 | Brunel |
| 7,298,797 | B2 | 11/2007 | Hwang et al. |
| 7,436,903 | B2 | 10/2008 | Sandhu et al. |
| 7,672,388 | B2 | 3/2010 | Frank |
| 7,792,206 | B2 | 9/2010 | Ylitalo et al. |
| 2002/0186785 | A1 | 12/2002 | Hoshino et al. |
| 2003/0086371 | A1 | 5/2003 | Walton et al. |
| 2003/0099216 | A1 | 5/2003 | Nilsson et al. |
| 2003/0148738 | A1 | 8/2003 | Das et al. |
| 2003/0169682 | A1 | 9/2003 | Chen et al. |
| 2004/0038651 | A1 | 2/2004 | Okuhata |
| 2004/0235433 | A1 | 11/2004 | Hugl et al. |
| 2005/0048933 | A1 | 3/2005 | Wu et al. |
| 2005/0113041 | A1 | 5/2005 | Polley et al. |
| 2005/0141641 | A1 | 6/2005 | Tanaka et al. |
| 2005/0220199 | A1 | 10/2005 | Sadowsky et al. |
| 2005/0254592 | A1 | 11/2005 | Naguib et al. |
| 2005/0281240 | A1 | 12/2005 | Oh et al. |
| 2006/0057969 | A1 | 3/2006 | Van Houtum |
| 2006/0068791 | A1 | 3/2006 | Lindoff |
| 2006/0120473 | A1 | 6/2006 | Baum |
| 2006/0146721 | A1 | 7/2006 | Attar et al. |
| 2006/0209883 | A1* | 9/2006 | Suzuki ........................ 370/465 |
| 2006/0239226 | A1 | 10/2006 | Khan |
| 2006/0270433 | A1 | 11/2006 | Kelton et al. |
| 2006/0274854 | A1 | 12/2006 | Matsumoto et al. |
| 2009/0081967 | A1 | 3/2009 | Imamura |
| 2009/0135940 | A1 | 5/2009 | Imamura |
| 2009/0279589 | A1 | 11/2009 | Nguyen |

FOREIGN PATENT DOCUMENTS

| | | | |
|---|---|---|---|
| CN | 1358357 | A | 7/2002 |
| EP | 1 605 607 | A1 | 12/2005 |
| JP | 11-205026 | A | 7/1999 |
| JP | 2005-191997 | A | 7/2005 |
| WO | WO 02/07341 | A2 | 1/2002 |
| WO | WO 2007/026882 | A1 | 3/2007 |

OTHER PUBLICATIONS

"Some Aspects of Single-Carrier Transmission for E-UTRA", 3GPP TSG RAN WG1 Meeting #42, Ericsson, R1-050765, Aug. 29, 2005, London, UK.

"System Peformance of Adaptive Cyclic Delay Diversity (ACDD) Scheme", 3GPP TSG RAN WG1 Meeting 42bis, Samsung, R1-051047, Oct. 10-14, 2005, San Diego, USA.

3GPP TSG RAN WG1 #42 on LTE, London, UK, Aug. 29-Sep. 2, 2005, R1-050795, pp. 1-5.

3GPP TSG RAN WG1 Ad Hoc on LTE, sophia Antipolis, France, Jun. 20-21, 2005, R1-050590, pp. 1-24.

3GPP TSG RAN WG1 Meeting #40bis, Beijing, China, Apr. 4-8, 2005, R1-050249, pp. 1-8.

3GPP TSG RAN WG1 Meeting #42, London, UK, Aug. 29-Sep. 2, 2005, R1-050888, pp. 1-16.

3GPP TSG RAN WG1 Meeting #42bis, San Diego, USA, Oct. 10-14, 2005, R1-051046, pp. 1-8.

Dammann et al., "Transmit/Receive-Antenna Diversity Techniques for OFDM Sysytems", European Transactions on Telecommunications, Wiley & Sons, Chichester, GB, vol. 13, No. 5, Sep. 1, 2001, pp. 531-538, XP002348091, ISSN: 1124-318X.

European Search Report dated Jan. 21, 2011 for European Application No. 06797294.3.

G. Auer, "Channel Estimation by Set Partitioning for OFDM with Cyclic Delay Diversity", 2004 IEEE, Sep. 26, 2004, pp. 669-673.

U.S. Notice of Allowance dated Mar. 22, 2011 for U.S. Appl. No. 12/693,058.

U.S. Notice of Allowance issued in U.S. Appl. No. 12/065,051 on Sep. 12, 2011.

U.S. Notice of Allowance issued in U.S. Appl. No. 12/092,048 on Mar. 7, 2013.

U.S. Notice of Allowance issued in U.S. Appl. No. 12/326,557 on Oct. 25, 2011.

U.S. Notice of Allowance issued in U.S. Appl. No. 12/326,557 on Sep. 22, 2011.

U.S. Notice of Allowance issued in U.S. Appl. No. 12/326,568 on Oct. 31, 2011.

U.S. Notice of Allowance issued in U.S. Appl. No. 12/326,581 on Jun. 20, 2011.

U.S. Notice of Allowance issued in U.S. Appl. No. 12/642,667 on Jul. 14, 2011.

U.S. Notice of Allowance issued in U.S. Appl. No. 12/692,986 on Oct. 12, 2011.

U.S. Notice of Allowance issued in U.S. Appl. No. 12/693,058 on Jul. 13, 2011.

U.S. Notice of Allowance issued in U.S. Appl. No. 12/693,058 on Oct. 6, 2010.

U.S. Notice of Allowance issued in U.S. Appl. No. 12/823,886 on Mar. 2, 2012.

U.S. Office Action dated Jan. 18, 2011 for U.S. Appl. No. 12/692,986.
U.S. Office Action dated Jan. 31, 2011 for U.S. Appl. No. 12/823,853.
U.S. Office Action dated Mar. 28, 2011 for U.S. Appl. No. 12/823,886
U.S. Office Action dated May 2, 2011 for U.S. Appl. No. 12/823,853
U.S. Office Action for U.S. Appl. No. 12/065,051, dated Mar. 14, 2011
U.S. Office Action for U.S. Appl. No. 12/326,557, dated Mar. 9, 2011.
U.S. Office Action for U.S. Appl. No. 12/326,581, dated Mar. 9, 2011.
U.S. Office Action for U.S. Appl. No. 12/642,667, dated Mar. 8, 2011.
U.S. Office Action issued in U.S. Appl. No. 12/089,361 on Dec. 2, 2011.

U.S. Office Action issued in U.S. Appl. No. 12/089,361 on Sep. 24, 2012.

U.S. Office Action issued in U.S. Appl. No. 12/092,048 on Mar. 2, 2012

U.S. Office Action issued in U.S. Appl. No. 12/092,048 on Oct. 15, 2012.

U.S. Office Action issued in U.S. Appl. No. 12/326,568 on Jul. 13, 2011.

U.S. Office Action issued in U.S. Appl. No. 12/823,886 on Oct. 19, 2011

U.S. Office Action, dated May 16, 2011, for U.S. Appl. No. 12/692,986.

U.S. Office Action, dated May 6, 2011, for U.S. Appl. No. 12/823,886.

\* cited by examiner

FIG. 14

| MCS INFORMATION | MODULATION | CODING RATE | TRANSMISSION SPEED |
|---|---|---|---|
| 1 | QPSK | 1/8 | 1.942Mbps |
| 2 | QPSK | 1/4 | 3.884Mbps |
| 3 | QPSK | 1/2 | 7.782Mbps |
| 4 | QPSK | 2/3 | 10.376Mbps |
| 5 | 16QAM | 1/2 | 15.582Mbps |
| 6 | 16QAM | 2/3 | 20.776Mbps |
| 7 | 64QAM | 1/2 | 23.382Mbps |
| 8 | 64QAM | 3/5 | 28.058Mbps |
| 9 | 64QAM | 2/3 | 31.176Mbps |
| 10 | 64QAM | 3/4 | 35.072Mbps |

FIG. 19

| PRIORITY | | f1 | f2 | f3 | f4 |
|---|---|---|---|---|---|
| | 1 | TERMINAL 12 | | TERMINAL 14 | |
| | 2 | TERMINAL 14 | | TERMINAL 12 | |
| | 3 | TERMINAL 13 | | TERMINAL 13 | |
| | 4 | | | | |
| | 5 | | | | |

FIG. 20

| | f1 | f2 | f3 | f4 |
|---|---|---|---|---|
| t1 | TERMINAL 12 | | TERMINAL 14 | |
| t2 | TERMINAL 13 | | TERMINAL 13 | |
| t3 | TERMINAL 13 | | TERMINAL 13 | |
| t4 | | | | |
| t5 | | | | |

| | f1 | f2 | f3 | f4 | |
|---|---|---|---|---|---|
| t1 | TERMINAL 12 | | TERMINAL 14 | | — L21 |
| t2 | | | | | |
| t3 | TERMINAL 13 | | TERMINAL 13 | | — L23 |
| t4 | | | | | |
| t5 | | | | | |

MULTI-MODE PHASE ROTATION APPARATUS THAT TRANSMITS CQI DEPENDING ON THE MODE USED

CROSS-REFERENCE TO RELATED APPLICATIONS

The present application is a Continuation Application of U.S. patent application Ser. No. 12/092,048, filed on Apr. 29, 2008, and for which priority is claimed under 35 U.S.C. §120; application Ser. No. 12/092,048 is the national phase of PCT International Application No. PCT/JP2006/321734, filed on Oct. 31, 2006 under 35 U.S.C. §371, which claims priority on Japanese Patent Application No. 2005-317266 filed in Japan on Oct. 31, 2005, the contents of which are incorporated in their entireties by reference herein.

TECHNICAL FIELD

The present invention relates to radio transmitters, radio communication systems, and radio transmission methods and in particular to transmitters and transmission methods for transmitting signals to radio receivers via multiple transmission antennas.

BACKGROUND ART

Recently, in multicarrier transmission systems, user scheduling methods for arranging multiple blocks along frequency axes and time axes have been provided. Regions that are secured when users perform communications and that are defined by frequency axes and time axes are referred to as assignment slots, and blocks forming the basis of assignment blocks, i.e. regions defined by prescribed frequency bands and prescribed time domains, are referred to as chunks.

In this connection, in transmission via broadcast/multicast channels and control channels, blocks that are broadened in frequency axes are assigned so as to get frequency diversity effects, thus making it difficult to cause errors in received signals even when received power is low; and in transmission of unicast signals via one-to-one communications between radio transmitters and radio receivers, blocks that are broadened in frequency axes are assigned so as to get multiuser diversity effects.

FIGS. 31 and 32 are drawings showing the relationships of signals, which are transmitted from radio transmitters to radio receivers, with reference to time (vertical axis) and frequency (horizontal axis). Transmission times t1 to t5 are set to the time axis. The transmission times t1 to t5 are identical to each other in time length. In addition, transmission frequencies f1 to f4 are set to the frequency axis. All the transmission frequencies f1 to f4 have the same frequency band of Fc. Thus, twenty chunks K1 to K20 are set by way of the transmission times t1 to t5 and the transmission frequencies f1 to f4.

By use of the chunks K1 to K20 shown in FIG. 31, as shown in FIG. 31, for example, four chunks K1 to K4 are coupled in the frequency axis and are equally divided into three regions along the time axis, thus setting communication slots S1 to S3, each of which has a time length of t1/3 and a frequency band of 4×f1. The assignment slot S1 is assigned to a first user; the assignment slot S2 is assigned to a second user; and the assignment slot S3 is assigned to a third user. Thus, it is possible for the first to third users to obtain frequency diversity effects.

The chunk K5 is assigned to a fourth user as an assignment slot S4. The chunks K6 and K7 are coupled to form an assignment slot S5, which is assigned to a fifth user. The chunk K8 is assigned to a sixth user as a slot S6. Thus, it is possible for the fourth to sixth users to obtain multiuser diversity effects.

The chunks K9 and K11 are coupled to form an assignment slot S7, which is assigned to a seventh user. The chunks K10 and K12 are coupled and then equally divided into three regions so as to set communication slots S8 to S10, each of which has a time length of t3/3 and a frequency band of 2×f2. The assignment slot S8 is assigned to an eighth user; the assignment slot S9 is assigned to a ninth user; and the assignment slot S10 is assigned to a tenth user. Thus, it is possible for the seventh to tenth users to obtain frequency diversity effects.

The chunk K13 is assigned to an eleventh user as an assignment slot S11. The chunk K14 is assigned to a twelfth user as an assignment slot S12. The chunks K15 and K16 are coupled so as to form an assignment slot S13, which is assigned to a thirteenth user. Thus, it is possible for the eleventh to thirteenth users to obtain multiuser diversity effects.

In addition, the chunks K17 and K19 are coupled so as to form an assignment slot S14, which is assigned to a fourteenth user. The chunks K18 and K20 are coupled and then equally divided into three regions so as to form communication slots S15 to S17, each of which has a time length of t5/3 and a frequency band of 2×f2. The assignment slot S15 is assigned to a fifteenth user; the assignment slot S16 is assigned to a sixteenth user; and the assignment slot S17 is assigned to a seventeenth user. Thus, it is possible for the fourteenth to seventeenth users to obtain frequency diversity effects.

Non-Patent Document 1: 3GPP document, R1-050249, "Downlink Multiple Access Scheme for Evolved UTRA", [retrieved on Aug. 17, 2005], Internet (URL: ftp://ftp.3gpp.org/TSG_RAN/WG1_RL1/TSGR1__40bis/Docs/R1-050249.zip)

Non-Patent Document 2: 3GPP document, R1-050590, "Physical Channel and Multiplexing in Evolved UTRA Downlink", [retrieved on Aug. 17, 2005], Internet (URL: ftp://ftp.3gpp.org/TSG_RAN/WG1   RL1/R1_Ad_Hocs/LTE_AH_June-05/Docs/R1-050590.zip)

DISCLOSURE OF INVENTION

Problem to be Solved by the Invention

The conventionally-known technology simply performs frequency diversity and multiuser diversity on signals transmitted via a single transmission antenna, thus transmitting signals to a radio receiver. That is, it cannot further improve communication quality by combining the diversities with a transmission diversity using multiple antennas.

The present invention is made in consideration of the aforementioned circumstances; and it is an object of the present invention to provide a radio transmitter, a radio communication system, and a radio transmission method, which can further improve communication quality with a radio transmitter by use of multiple transmission antennas.

Means for Solving the Problem

A radio transmitter of the present invention is provided to solve the aforementioned problem, wherein it has a scheduler for assigning a communication time and a communication frequency to each radio receiver based on quality information of received signals communicated by a radio receiver, a transmission circuit controller for transmitting whether a frequency diversity region or a multiuser diversity region is selected in each chunk, and a transmission circuit for applying different delay times to signals of multiple transmission antennas based on a transmission result of the transmission control circuit.

The transmission circuit of the radio transmitter of the present invention sets different maximum delay times for transmission antennas in connection with the frequency diversity region and the multiuser diversity region.

The transmission circuit of the radio transmitter of the present invention set the maximum delay times of the multiple transmission antennas to be larger than 1/Fc in the frequency diversity region and to be smaller than 1/Fc in the multiuser diversity region.

The transmission circuit of the radio transmitter of the present invention applies the same delay time to each transmission antenna with respect to at least a common pilot signal included in the common chunk via a downlink common data channel.

The transmission circuit controller of the radio transmitter of the present invention divides the frequency diversity region and the multiuser diversity region on the frequency axis.

The transmission circuit controller of the radio transmitter of the present invention divides the frequency diversity region and the multiuser diversity region on the time axis.

The transmission circuit controller of the radio transmitter of the present invention divides the frequency diversity region and the multiuser diversity region on both the frequency axis and the time axis.

The scheduler of the radio transmitter of the present invention compares received signals of radio receivers in terms of quality information so as to determine the priority order, thus assigning chunks to radio receivers based on the determination result.

The transmission circuit controller of the radio transmitter of the present invention controls the transmission circuit such that a chunk included in the frequency diversity region matches a chunk included in the multiuser diversity region when the priority order is determined by comparing received signals of radio receivers in terms of quality information, and a chunk included in the frequency diversity region matches a chunk included in the multiuser diversity region when chunks are assigned to radio receivers based on the priority order.

In addition, the transmission circuit controller of the radio transmitter of the present invention controls the transmission circuit such that a chunk included in the frequency diversity region differs from a chunk included in the multiuser diversity region when the priority order is determined by comparing received signals of radio receivers in terms of quality information, and a chunk included in the frequency diversity region differs from a chunk included in the multiuser diversity region when chunks are assigned to radio receivers based on the priority order.

The radio transmitter of the present invention applies different delay times to regions defined by time and frequency.

The radio transmitter of the present invention applies different delay times to signals transmitted via multiple transmission antennas.

The radio transmitter of the present invention is a radio transmitter that assigns transmission signals to regions defined by time and frequency, wherein the same delay time is periodically applied to regions along the time axis.

The radio transmitter of the present invention is a radio transmitter that assigns transmission signals to regions defined by time and frequency, wherein the same delay time is periodically applied to regions along the frequency axis.

The radio transmitter of the present invention has a scheduler for assigning regions defined by time and frequency to radio receivers based on quality information regarding received signals of radio receivers.

The radio communication system of the present invention is constituted of a base station having the radio transmitter and a terminal that receives transmission signals transmitted from the base station so as to transmit the quality information of received signals to the base station.

The radio transmission method of the present invention assigns communication times and communication frequencies to radio receivers based on quality information regarding received signals of radio receivers; it transmits whether each chunk is set to the frequency diversity region or the multiuser diversity region; and it applies different delay times to signals of multiple transmission antennas based on the transmission result.

Effect of the Invention

In the present invention, based on the quality information regarding received signals of radio receivers, the scheduler assigns communication times or communication frequencies to radio receivers; the transmission circuit controller transmits whether each chunk is set to the frequency diversity region or the multiuser diversity region; and the transmission circuit applies different delay times to signals of multiple transmission antennas based on the transmission result of the transmission circuit controller.

Thus, by assigning communication times or communication frequencies to radio receivers based on quality information regarding received signals of radio receivers, it is possible to get very high multiuser diversity effects, thus improving communication quality.

BRIEF DESCRIPTION OF THE DRAWINGS

FIG. 14 A table for explaining MCS information in the second embodiment.

FIG. 19 A table for explaining the operation of a scheduler 19 in the second embodiment.

FIG. 20 A table for explaining the operation of the scheduler 19 in the second embodiment.

FIG. 28 A table for explaining the operation of the scheduler 19 in the fourth embodiment.

Figure 1:
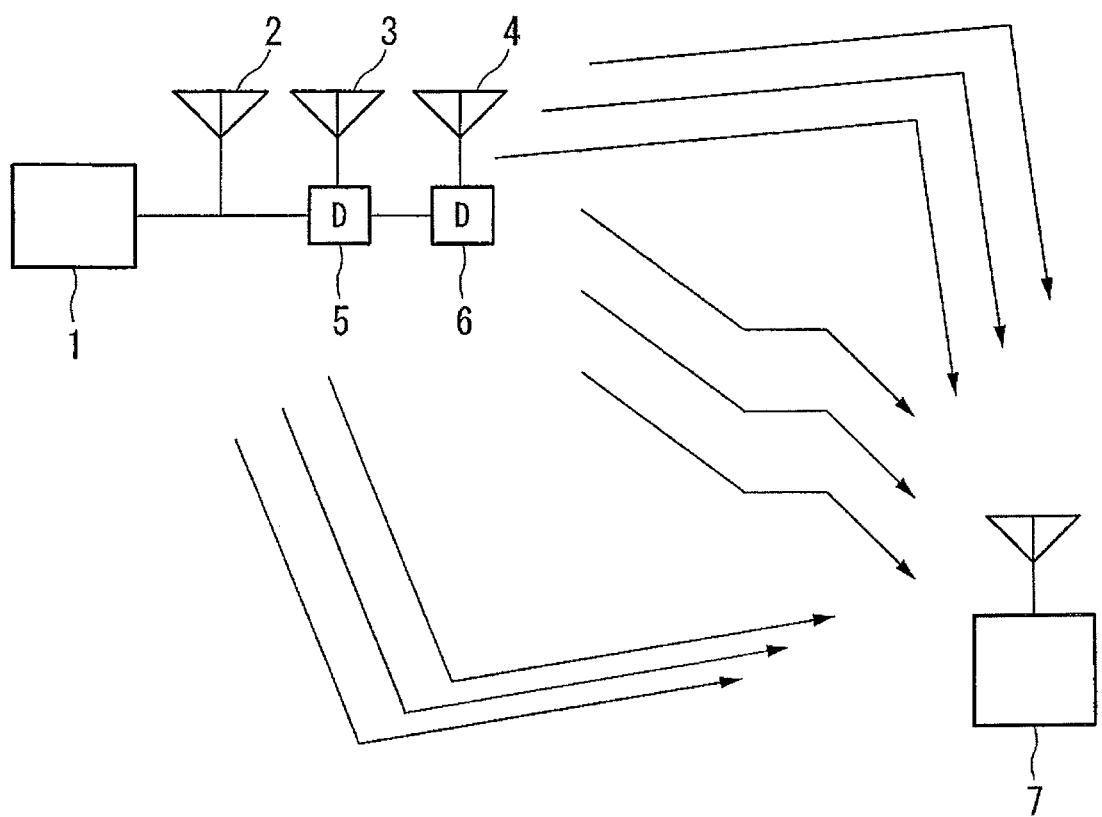
FIG. 1 An illustration showing that signals are transmitted from a radio transmitter of a first embodiment to a radio receiver.

DESCRIPTION OF THE REFERENCE NUMERALS 1 radio receiver
2-4 transmission antenna
5, 6 delay
7 radio receiver
8 radio transmitter
9, 10 radio receiver
11 base station
12-14 terminal
15 PDCP
16 RLC
17 MAC
18 physical layer
19 scheduler
20 transmission circuit controller
21 transmission circuit
22 reception circuit
23 radio frequency converter
24-26 transmission antenna
31a, 31b user-dependent signal processor
32 error correction coding
33 modulator
34 sub-carrier assignment
35 weighted multiplication
36 IFFT
37 parallel-to-series converter
38 GI addition section
39 filter
40 D/A converter
41-1, 41-2, 41-3 antenna-dependent signal processor
42 weight calculation
43 pilot signal generation

BEST MODE FOR CARRYING OUT THE INVENTION

First Embodiment

FIG. 1 is an illustration for explaining the method for transmitting signals from a radio transmitter of a first embodiment of the present invention to a radio receiver. Signals transmitted by the radio transmitter 1 reach the radio receiver 7 via multiple propagation paths. The radio transmitter 1 has a plurality of transmission antennas 2 to 4.

A delay section 5 imparts a delay time T to signals transmitted by the transmission antenna 3 in comparison with signals transmitted by the transmission antenna 2. In addition, delay sections 5 and 6 impart a delay time 2T to signals transmitted by the transmission antenna 4.

The radio receiver 7 receives signals transmitted from the radio transmitter 1. In FIG. 1, an example in which the transmitter 1 has three transmission antennas 2 to 4 is described; but the number of transmission antenna is not necessarily limited to this number.

The transmission antennas described above are transmission antennas, which are installed in a radio transmitter facilitated in a base station for cellular phones; hence, they can be realized using transmission antennas adapted for the same sector, different sectors of the same base station, and different base stations respectively. The following description is given with respect to transmission antennas adapted for the same sector, for example.

Figure 2A:
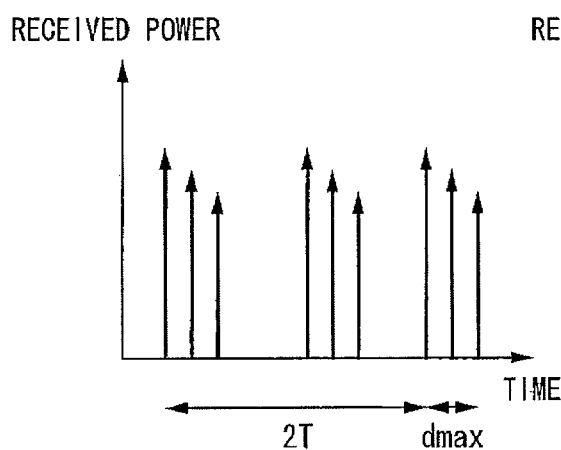
FIG. 2A A delay profile showing that transmission signals are transmitted to a radio receiver via multiple propagation paths having different delay times in terms of time (horizontal axis) and received power (vertical axis).
Figure 2B:
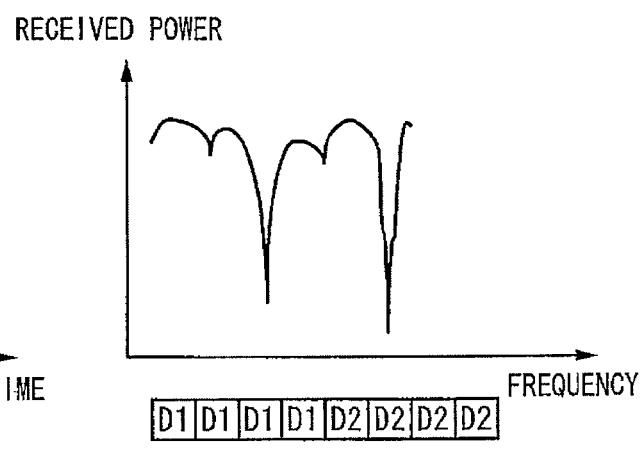
FIG. 2B A graph showing a transfer function, which is produced by performing frequency conversion on the delay profile of FIG. 2A, in terms of frequency (horizontal axis) and received power (vertical axis).

FIGS. 2A and 2B are graphs showing a delay profile and a transfer function with respect to signals that reach a radio receiver via multiple (three) propagation paths having different delay times. FIG. 2A shows the delay profile representing that transmission signals reach the radio receiver via multiple propagation paths having different delay times with respect to time (horizontal axis) and received power (vertical axis). It shows that an instantaneous maximum delay time for the delay profile is 2T+dmax; hence, maximum delay waves are very high in comparison with ones that occur when each transmission antenna transmits the same signal. Herein, 2T represents a delay time difference between a signal, which reaches a reception antenna first, and a signal, which reaches the reception antenna lately, within radio waves generated by multiple transmission antennas. In addition, dmax represents an incoming time difference between a very fast propagation path, via which radio waves of the same transmission reach the reception antenna, and a very slow propagation path.

FIG. 2B shows the transfer function that is produced by performing frequency conversion of the delay profile of FIG. 2A with respect to frequency (horizontal axis) and received power (vertical axis). In the delay profile described above, an event in which the maximum delay time 2T+dmax is long indicates that frequency variations are rapid in the transfer function. Therefore, as shown in FIG. 2B, data D1 and D2 spread with a spreading factor 4 and are assigned with subcarriers. In this connection, it is preferable for the radio transmitter 1 to control the spreading factor or the coding rate of error correction coding in response to frequency variations of the transfer function. In the aforementioned method, since the delay time 2T is known in the radio transmitter 1, it is possible to determine the spreading factor or the coding rate of error correction coding irrespective of frequency variations of propagation paths.

On the other hand, in order to get multiuser diversity effects, it is preferable that the instantaneous maximum delay time 2T+dmax of the delay profile be not overly long.

Figure 3A:
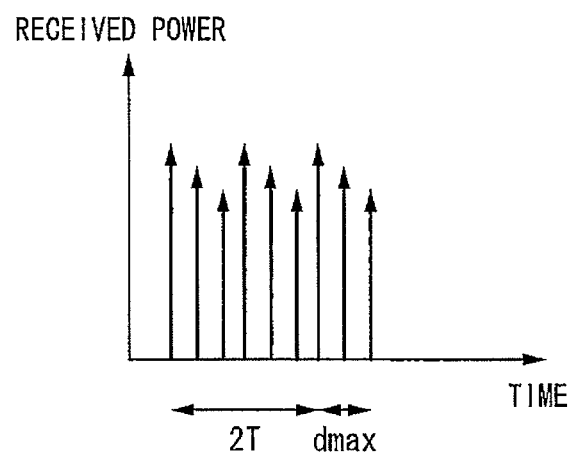
FIG. 3A A graph showing a delay profile, which indicates that transmission signals are transmitted to a radio receiver via multiple (three) propagation paths having different delay times, in terms of time (horizontal axis) and received power (vertical axis).
Figure 3B:
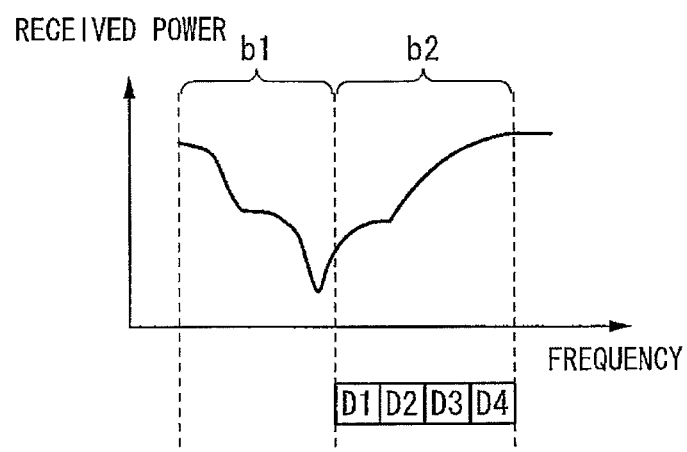
FIG. 3B A graph showing a transfer function of a radio receiver used by a user u1.
Figure 3C:
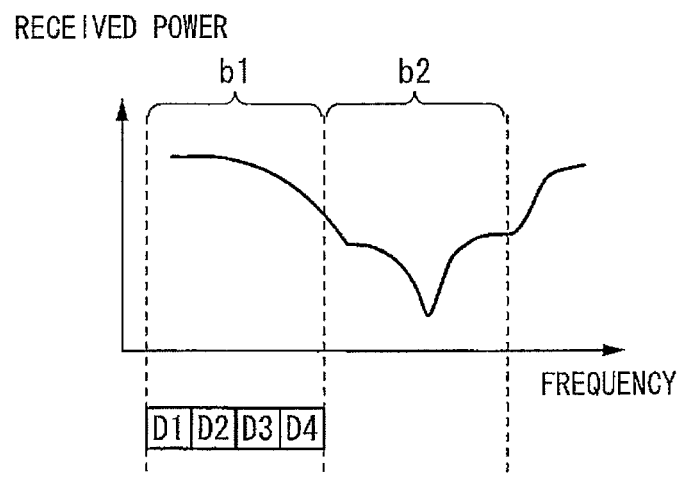
FIG. 3C A graph showing a transfer function of a radio receiver used by a user u2.

FIGS. 3A, 3B, and 3C are graphs showing the delay profile and transfer functions with respect to signals that reach the radio receiver via multiple propagation paths having different delay times. FIG. 3A shows the delay profile in which transmission signals reach radio receivers via multiple (three) propagation paths having different delay times with respect to time (horizontal axis) and received power (vertical axis).

FIG. 3B shows the transfer function regarding the radio receiver used by a user u1. FIG. 3C shows the transfer function regarding the radio receiver used by a user u2. Since the radio receivers of the users u1 and u2 are located at different positions, the transfer functions thereof differ instantaneously.

When a low frequency range is connected to a frequency channel b1 and a high frequency range is connected to a frequency channel b2 in the frequencies shown in FIGS. 3B and 3C, the user u1 obtains a good quality in the frequency channel b2 but the user u2 obtains a good quality in the frequency channel b1. Therefore, the radio transmitter transmits data D1 to D4 via the frequency channel b2 with respect to the user u1. In addition, the radio transmitter transmits data D1 to D4 via the frequency channel b1 with respect to the user u2.

By use of instantaneous difference of qualities between frequency channels, it is possible to get multiuser diversity effects for improving the transmission efficiency by performing communications via different frequency channels by users.

However, when the maximum delay time 2T+dmax becomes very long, frequency variations of the transfer function become rapid so that the difference of qualities between the frequency channels b1 and b2 becomes small. Therefore, in order to get adequate multiuser diversity effects, it is important to reduce the maximum delay time 2T+dmax as shown in FIG. 3A.

Figure 4A:
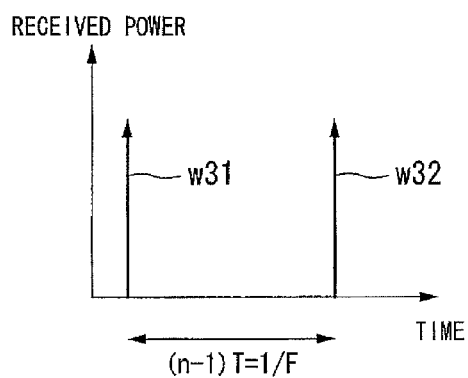
FIG. 4A A graph showing the relationship between time and received power.
Figure 4B:
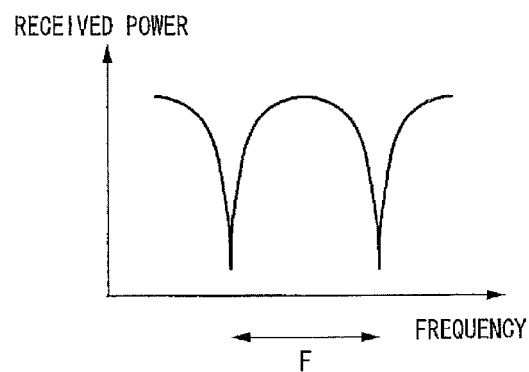
FIG. 4B A graph showing the relationship between frequency and received power.
Figure 5A:
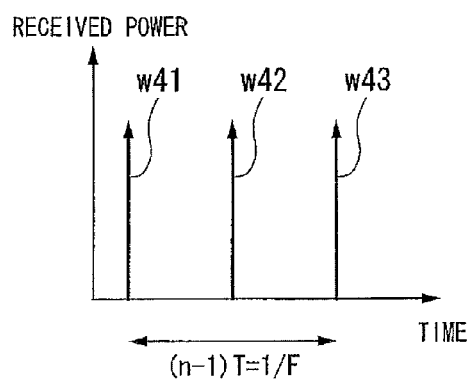
FIG. 5A A graph showing the relationship between time and received power.
Figure 5B:
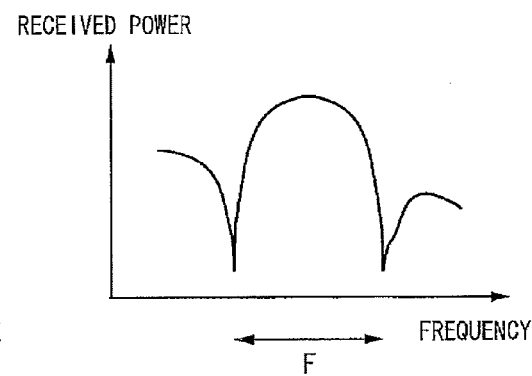
FIG. 5B A graph showing the relationship between frequency and received power.

FIGS. 4A and 4B and FIGS. 5A and 5B are graphs showing the relationship between a maximum delay time $(n-1)T$ and frequency variations. When an incoming time difference between two incoming waves w31 and w32 is $(n-1)T$ as shown in FIG. 4A, the transfer function of this propagation path is as shown in FIG. 4B. That is, an interval of amplitude drops regarding the received power (vertical axis) is $F=1/(n-1)T$.

It is described above how frequency diversity effects and multiuser diversity effects differ in terms of frequency variations of transfer functions; hence, in order to get frequency diversity effects, the maximum delay time $(n-1)T$ between transmission antennas is set in a range of $(n-1)T>1/Fc$ where Fc denotes the frequency bandwidth of a chunk, which is a basic region that is defined with respect to the frequency axis and time axis and that is secured when the user perform communication; thus, it is possible to create an environment easily achieving frequency diversity effects.

On the other hand, in order to get multiuser diversity effects, the maximum delay time $(n-1)T$ between transmission antennas is set in a range of $(n-1)T<1/Fc$ where Fc denotes the frequency bandwidth of a chunk; thus it is possible to create an environment easily achieving multiuser diversity effects. In the following description, the inequality of $(n-1)T<1/Fc$ may embrace $(n-1)T=0$. In the following description, the delay time imparted to each transmission antenna is expressed as n−1 times longer than the delay time T, wherein T remains constant, whereas T can be varied in connection with each transmission antenna.

In order to get multiuser diversity effects, instead of setting $(n-1)T<1/Fc$, it is possible to reduce the number of transmission antennas for use in transmission of signals, thus reducing the maximum delay time.

As described above, in respect of transmission signals via the frequency diversity or the multiuser diversity ($(n-1)T>1/Fc$ or $(n-1)T<1/Fc$), it is possible to get frequency diversity effects and multiuser diversity effects without being influenced by conditions of propagation paths.

In this connection, it is possible to switch over transmission of signals from the radio transmitter by way of the frequency diversity or the multiuser diversity in response to types of transmission signals (pilot signals, control signals, broadcast/multicast signals, etc.) and moving speeds of radio receivers (wherein the frequency diversity is selected in a high moving speed, while the multiuser diversity is selected in a low moving speed).

Figure 6A:
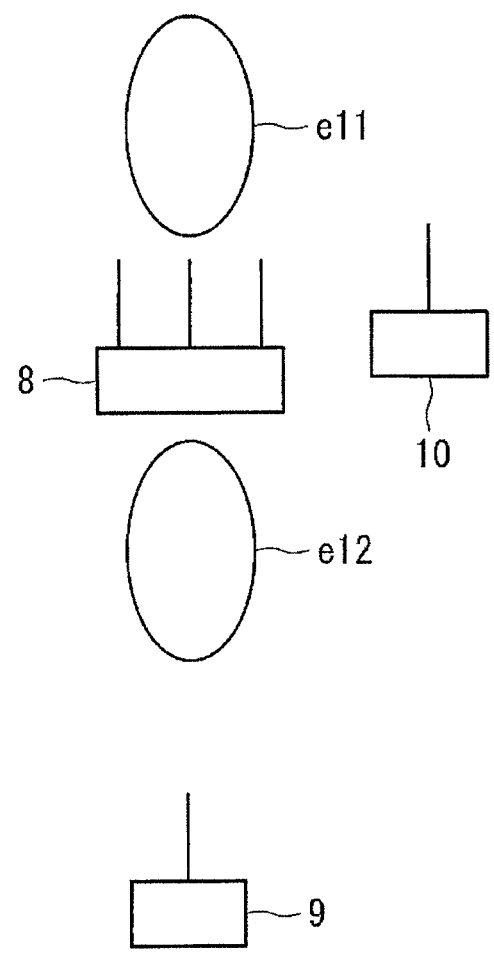
FIG. 6A An explanatory illustration showing that the same signal is transmitted without being applied with delays from multiple antennas of the first embodiment.
Figure 6B:
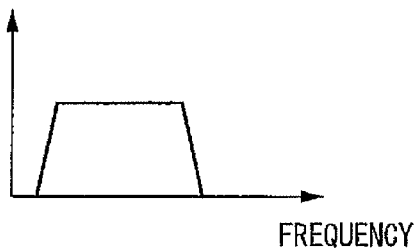
FIG. 6B A graph showing the relationship between frequency and received power with respect to received signals of a radio receiver 9.
Figure 6C:
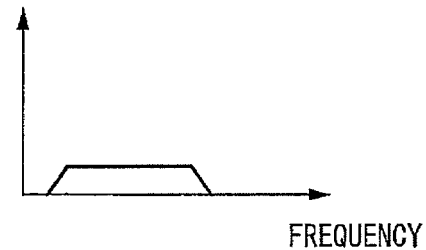
FIG. 6C A graph showing the relationship between frequency and received power with respect to received signals of a radio receiver 10.

FIGS. 6A to 6C are illustrations for explaining that a radio transmitter 8 transmits the same signal to radio receivers via multiple transmission antennas without imparting delay times thereto. As shown in FIG. 6A, the radio transmitter 8 is equipped with multiple (three) transmission antennas, which are disposed in parallel with each other and which do not have directivity in a horizontal direction, wherein lobes e11 and e12 encompassed by ellipses occur as shown in FIG. 6A; this causes a direction (see FIG. 6B), in which a radio receiver 9 receives signals at a high received power over all frequency bands, and a direction (see FIG. 6C), in which a radio receiver 10 receives signals at a low received power over all frequency bands.

Figure 7A:
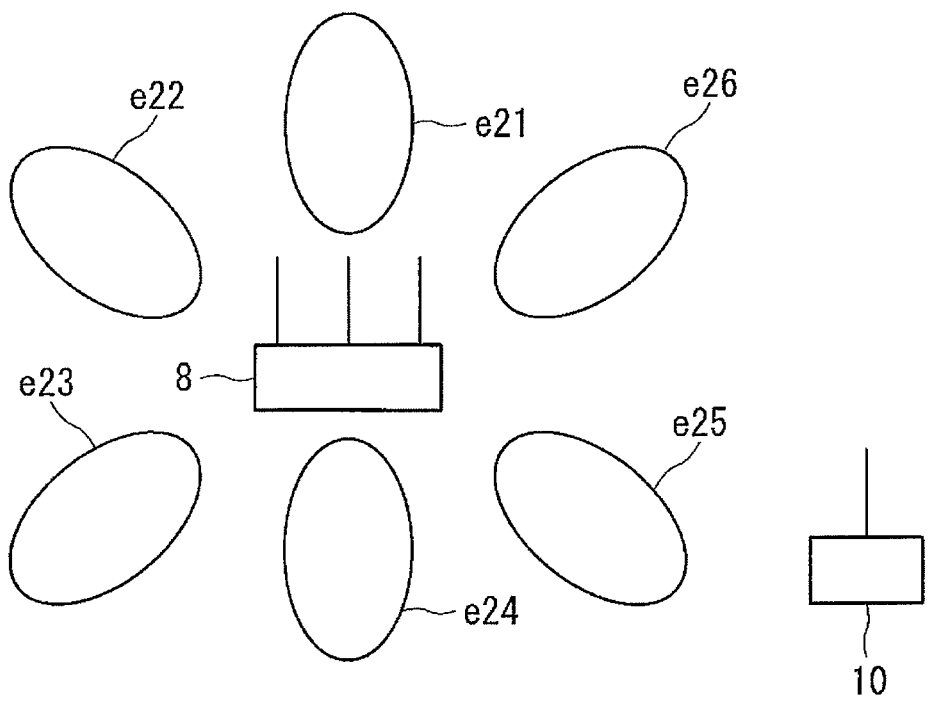
FIG. 7A An explanatory illustration showing that the same signal applied with different delays is transmitted via multiple antennas of the first embodiment.
Figure 7A:
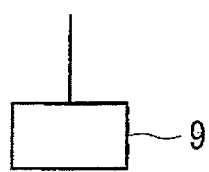
Figure 7B:
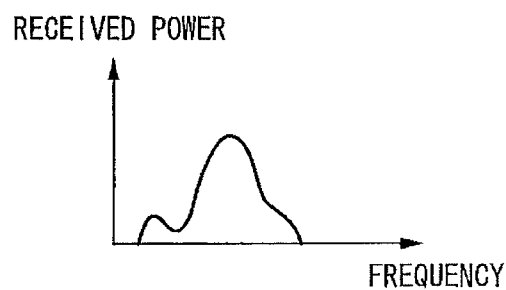
FIG. 7B A graph showing the relationship between frequency and received power with respect to received signals of the radio receiver 9.
Figure 7C:
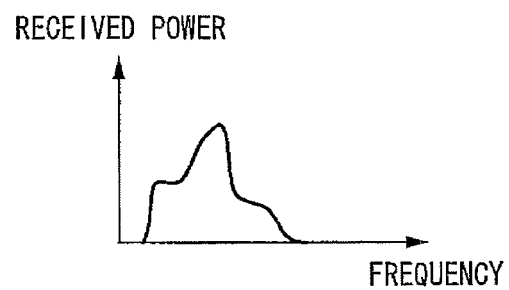
FIG. 7C A graph showing the relationship between frequency and received power with respect to received signals of the radio receiver 10.

FIGS. 7A to 7C are illustrations for explaining that the radio transmitter 8 transmits the same signal to radio receivers via multiple transmission antennas with different delay times. As shown in FIG. 7A, the radio transmitter 8 is equipped with multiple (three) transmission antennas, which are disposed in parallel with each other and which do not have directivity in the horizontal direction, wherein lobes e21 to e26 encompassed by ellipses occur in a narrow band as shown in FIG. 7A. This causes a frequency band achieving a high received power and a frequency band achieving a low received power with respect to received signals, and it is possible to maintain the average received power substantially constant irrespective of directions; hence, it is possible to achieve substantially the same quality with respect to both of the received power of signals in the radio receiver 9 (see FIG. 7B) and the received power of signals in the radio receiver 10 (see FIG. 7C). Therefore, the method, in which the radio transmitter 8 transmits signals via transmission antennas with different delay times, can compensate for the drawback explained with FIG. 6, in which the same signal is transmitted via multiple transmission antennas.

Figure 8:
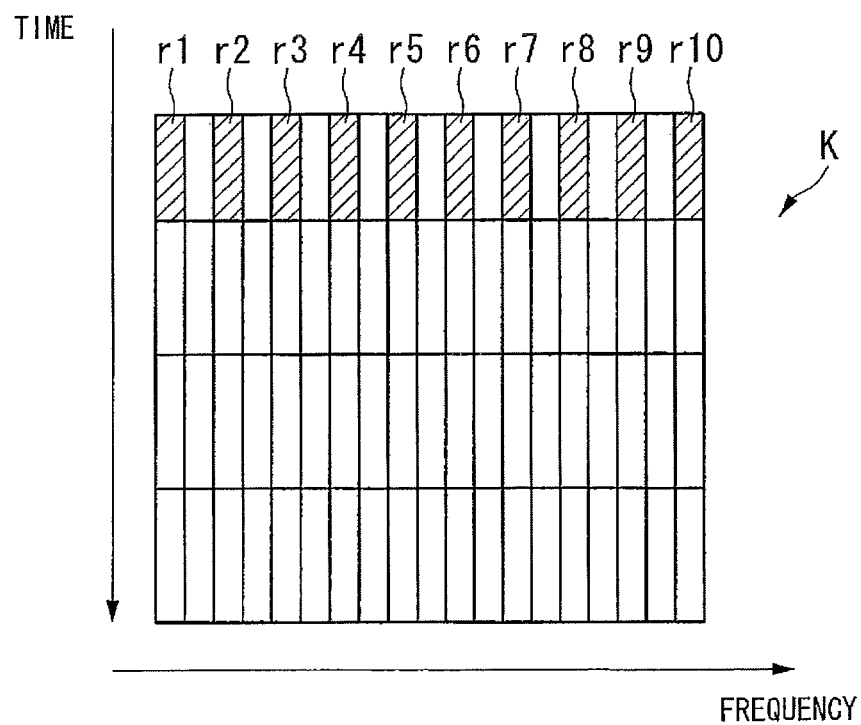
FIG. 8 An illustration showing signal configurations of chunks in the first embodiment.

FIG. 8 is a graph showing the configuration of a chunk K used in the present embodiment. It shows that the chunk K is composed of nineteen sub-carriers, which are disposed in a frequency axis direction (a horizontal axis direction), and four OFDM (Orthogonal Frequency Division Multiplexing) symbols, which are disposed in a time axis direction (a vertical axis). A common pilot channel lies in regions r1 to r10 as shown in the figure, wherein it is used for estimating a propagation path and for measuring quality of received signals in decoding of a radio receiver.

Figure 9:
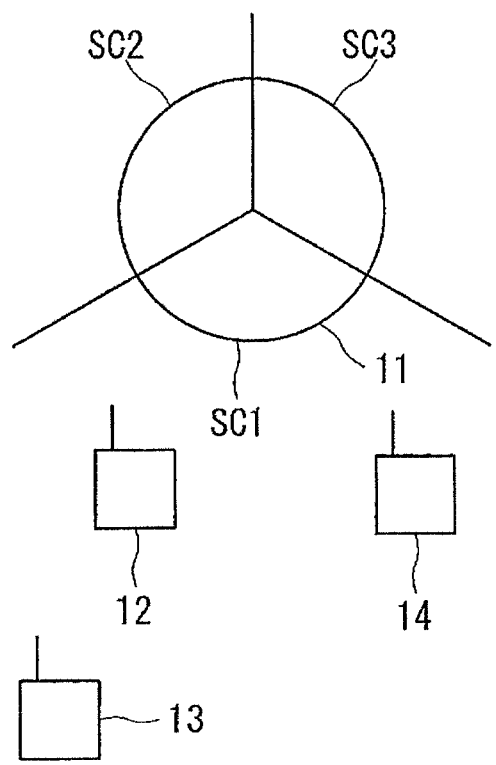
FIG. 9 An illustration showing the arrangement of a base station and a terminal in the first embodiment.

FIG. 9 is a plan view showing an example of the positioning relationship between a base station 11 and multiple terminals. Terminals 12, 13, and 14 serving as radio receivers are positioned in the periphery of the base station 11 serving as a radio transmitter, wherein they perform communications with the base station 11. The base station 11 is composed of three sectors SC1 to SC3, each of which is equipped with multiple (e.g., three) transmission antennas. That is, the three terminals 12 to 14 perform communications with the prescribed single sector SC1 in accordance with the method explained with FIG. 1.

Multiple transmission antennas can be realized using transmission antennas adapted to the same sector, different sectors of the same base station, different base stations; hence, multiple transmission antennas can be installed in different sectors of the same base station or in different base stations as described below.

A graph of FIG. 10(a) shows a transfer function C11 monitored in the multiuser diversity region. A graph of FIG. 10(b) shows a transfer function C 12 monitored in the frequency diversity region. In graphs of FIGS. 10(a) and (b), the horizontal axis represents frequency, and the vertical axis represents received power. The graphs of FIGS. 10(a) and (b) show the transfer functions C11 and C12 monitored by the terminal 12 of FIG. 9. In the graphs of FIGS. 10(a) and (b), the frequency axis f crosses the received power axis at prescribed values of the received power.

FIG. 10(c) is an illustration for explaining the method for performing communications by assigning the chunks K1 to K20, which are divided by way of the frequency axis (horizontal axis) direction and the time axis (vertical axis), to users. In the illustration of FIG. 10(c), the chunks K1, K5, K9, K13, and K17 form a group L11. The chunks K2, K6, K10, K14, and K18 form a group L12. The chunks K3, K7, K11, K15, and K19 form a group L13. The chunks K4, K8, K12, K16, and 20 form a group L14.

The groups L11 and L13 are set to the multiuser diversity region in advance, and the groups L12 and L14 are set to the frequency diversity region in advance.

Therefore, the terminal calculates the transfer function of a propagation path by use of a common pilot channel of the chunks included in the group L11, thus monitoring a frequency band f1 with regard to the transfer function C11. Similarly, it calculates the transfer function of a propagation path by use of a common pilot channel of the chunks included in the group L12, thus monitoring a frequency band f2 with regard to the transfer function C12. It calculates the transfer function of a propagation path by use of a common pilot channel of the chunks included in the group L13. It calculates the transfer function of a propagation path by use of a common pilot channel of the chunks included in the group L14, thus monitoring a frequency band f4 with regard to the transfer function C12.

The situation, in which the chunks K1 to K20 are divided into the groups L11 to L14 and are also assigned to the multiuser diversity region and the frequency diversity region respectively, is fixed and unchanged in the system design or can be dynamically changed in response to conditions of terminals (the number of terminals, the number of high-speed moving terminals, and the amount of information subjected to transmission).

A graph of FIG. 11(a) shows a transfer function C21 monitored in the multiuser diversity region. A graph of FIG. 11(b) shows a transfer function C22 monitored in the frequency diversity region. In the graphs of FIGS. 11(a) and (b), the horizontal axis represents frequency, and the vertical axis represents received power. The graphs of FIGS. 10(a) and (b) show the transfer functions C21 and C22 monitored by the terminal 14 of FIG. 9. They differ from the graphs of FIGS. 10(a) and (b) with respect to the position of the terminal for monitoring propagation paths; hence, the transfer functions C21 and C22 are monitored differently than the transfer functions C11 and C12 shown in the graphs of FIGS. 10(a) and (b). In the graphs of FIGS. 11(a) and (b), the frequency axis f crosses the received power axis at prescribed values of the received power.

FIG. 11(c) is an illustration for explaining the method for performing communications by assigning the chunks K1 to K20, which are divided along the frequency axis (horizontal axis) direction and time axis (vertical axis), to users. The assignment of the chunks K1 to K20 into the groups L11 to L14 is similar to that shown in the graph of FIG. 10(c); hence, the description thereof will be omitted.

The terminal 14 (FIG. 9) calculates the transfer function of a propagation path by use of a common pilot channel of the chunks included in the group L11, thus monitoring the frequency band f1 with regard to the transfer function C21. It calculates the transfer function of a propagation path by use of a common pilot channel of the chunks included in the group L12, thus monitoring the frequency band f2 with regard to the transfer function C22. It calculates the transfer function of a propagation path by use of a common pilot channel of the chunks included in the group L13, thus monitoring the frequency band f3 with regard to the transfer function C21. It calculates the transfer function of a propagation path by use of a common pilot channel of the chunks included in the group L14, thus monitoring the frequency band f4 with regard to the transfer function C22.

When the quality of received signals of each chunk is transmitted as the information included in CQI (Channel Quality Indicator) that is transmitted to the base station via each channel, the terminal 12 (FIG. 9) performs comparison between the groups L11 and L13, i.e., it compares the frequency band f1 of the transfer function C11 and the frequency band f3 of the transfer function C11 in the quality of received signals in the base station, which thus assigns the group L11 (or the frequency band f1) to the terminal 12 so as to transmit signals.

Similarly, the terminal 14 (FIG. 9) performs comparison between the groups L11 and L13, i.e. it compares the frequency band f1 of the transfer function C21 and the frequency band f3 of the transfer function C21 in the quality of received signals in the base station, which thus assigns the group L13 (or the frequency band f3) to the terminal 14 so as to transmit signals.

Thus, when the base station applies different delay times to transmission antennas in connection with the frequency diversity region and the multiuser diversity region, the frequency diversity region and the multiuser diversity region are determined in advance so as to apply different delay times to common pilot channels included therein, wherein scheduling is performed in accordance with the CQI information from the terminal, so that chunks are appropriately assigned to each terminal, thus producing adequate multiuser diversity effects.

Second Embodiment

Figure 12:
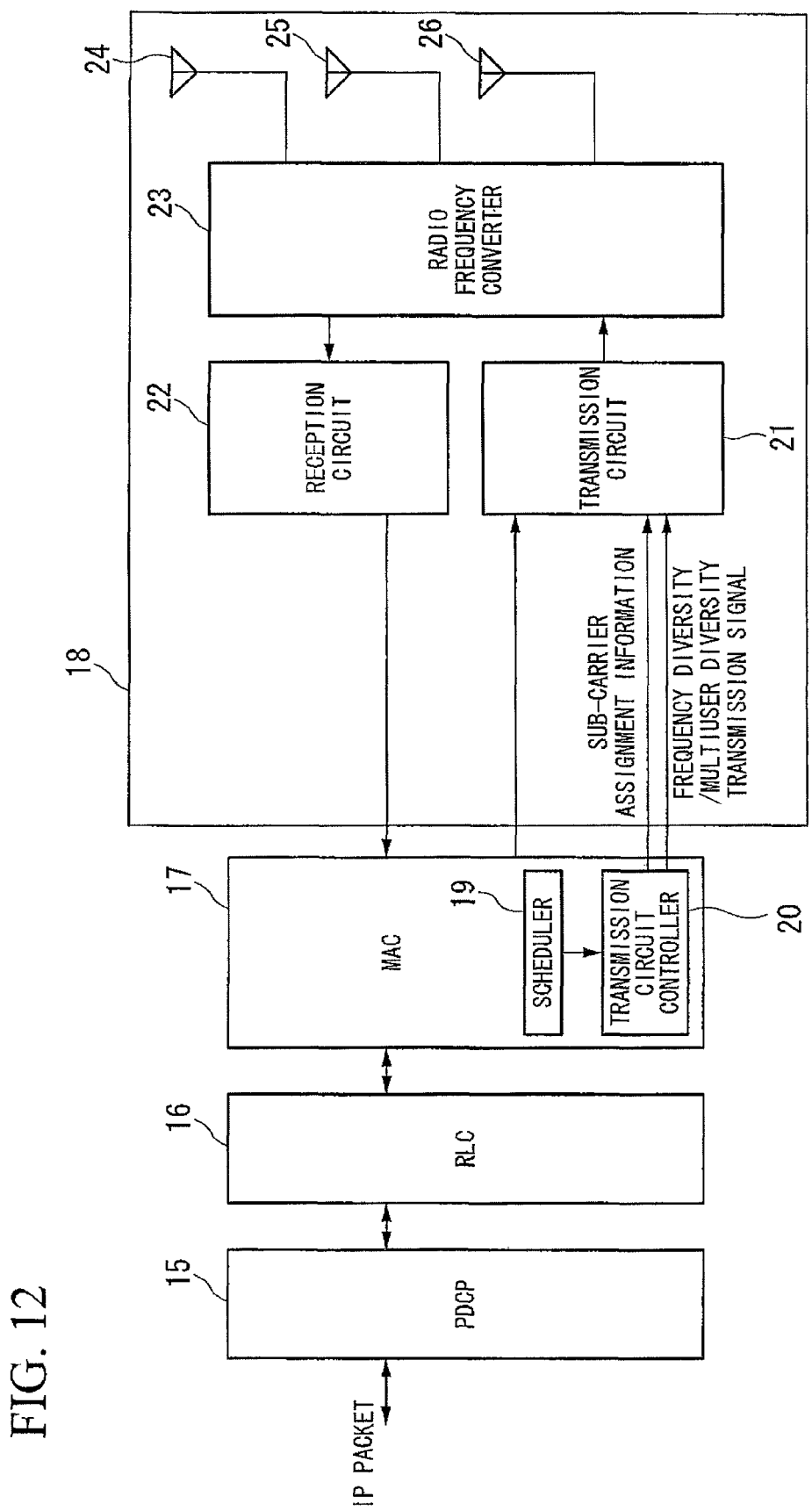
FIG. 12 A diagram showing the constitution of a base station in a second embodiment.

FIG. 12 is a block diagram showing the constitution of a base station in accordance with a second embodiment of the present invention.

The base station receives IP (Internet Protocol) packets and compresses their headers so as to transfer them to an RLC (Radio Link Control) section 16, wherein it has a PDCP (Packet Data Convergence Protocol) section 15 that restores headers so as to convert received data from the RLC section 16 into IP packets. In addition, it transfers received data from the PDCP section 15 to an MAC (Media Access Control) section 17, while it transfers data from the MAC section 17 to the PDCP section 15 by way of the RLC section 16.

The MAC section 17 performs ARQ (Automatic Repeat Request) processing, scheduling processing, connection/disconnection of data, and control of a physical layer 18, wherein it transfers received data from the RLC section 16 to the physical layer 18, while it transfers transferred data from the physical layer 18 to the RLC section 16. The physical layer 18 converts transmission data from the MAC section 18 into radio transmission signals and transfers radio transmission signals to the MAC section 17 under the control of the MAC section 17.

The MAC 17 has a scheduler 19 that determines assignment slots for performing communications with respect to each of terminals that perform communications with the base station. Specifically, the scheduler 19 assigns chunks, dependent upon communication times and communication frequencies, to radio receivers based on quality information (received power, received SINR, etc.) of received signals transmitted by radio receivers.

A transmission circuit 21 of the physical layer 18 is controlled using sub-carrier assignment information based on chunk assignment information transmitted by the scheduler 19, wherein the MAC 17 has a transmission circuit controller 20 that controls the maximum delay time between transmission antennas in response to the frequency diversity region and the multiuser diversity region, which are described with reference to FIGS. 2 and 3 and FIGS. 10 and 11, by use of frequency diversity/multiuser diversity transmission signals.

The following description is given in such a way that the frequency diversity region and the multiuser diversity region are divided on the frequency axis; but it is not necessarily limited to such a constitution. For example, it is possible for the transmission circuit controller 20 to divide the frequency diversity region and the multiuser diversity region on the time axis.

The physical layer 18 includes a reception circuit 22 that demodulates the output of a radio frequency converter 23 so as to transfer it to the MAC 17. The radio frequency converter 23 converts transmission signals from the transmission circuit 21 to suit radio frequencies, and it also converts received signals received by transmission antennas 24 to 26 to suit frequency bands executing processing of the reception circuit 22. In addition, it includes the transmission antennas 24 to 26 that transmit transmission signals from the radio frequency converter 23 to the radio space and that receives signals in the radio space.

Figure 13:
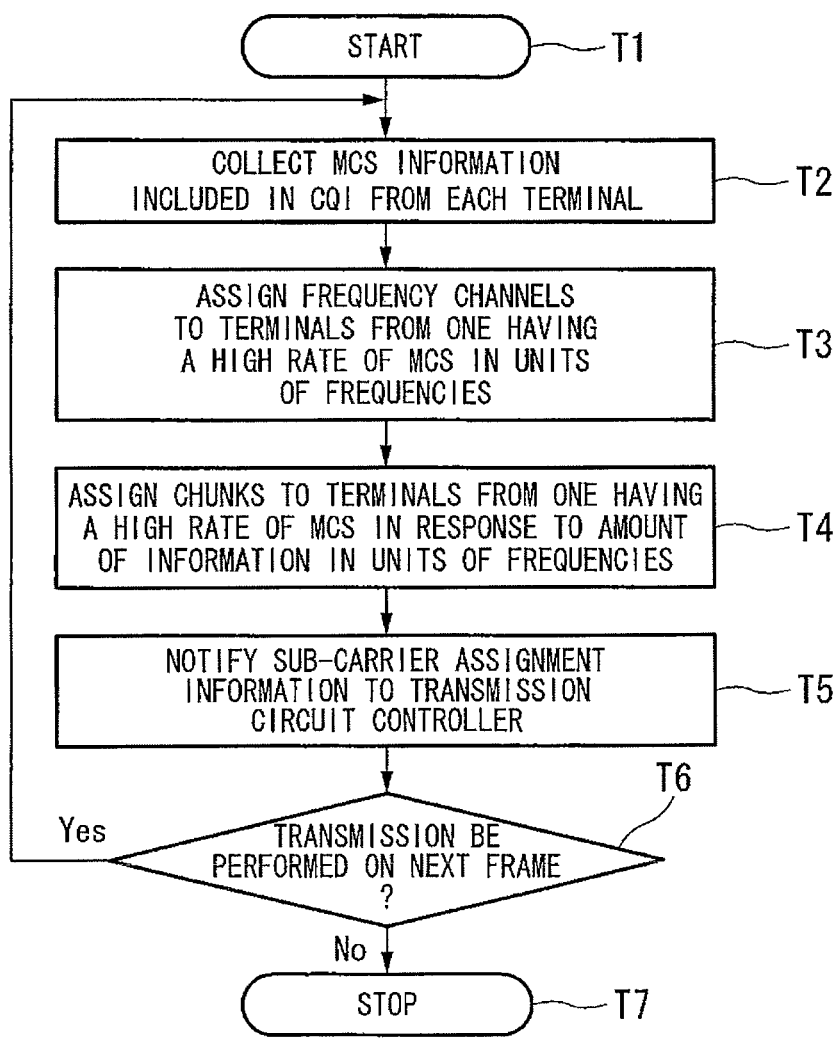
FIG. 13 A flowchart showing the operation of a scheduler 19 in the second embodiment.

FIG. 13 is a flowchart showing the processing of the scheduler 19 (FIG. 12). First, the scheduler 19 collects pieces of MCS (Modulation and Coding Scheme) information included in CQI from each terminal (step T2). Then, assignment of frequency channels is performed in order from a terminal having a high transfer speed of MCS in units of frequencies (step T3). Then, assignment of chunks is performed in order from a terminal having a high transfer speed of MCS in units of frequencies in response to its information value (step T4). Then, chunk assignment information obtained in the step T4 is supplied to the transmission circuit controller 20 (step T5). When a transmission schedule is set to transmit the next transmission frame, the flow returns to the step T2, whereas when such a transmission schedule is not set, the flow proceeds to step T7 so as to end the processing (step T6). Thereafter, the processing of the scheduler 19 is ended (step T7).

The aforementioned description is given in such a way that the terminal transmits the MCS information to the base station. However, the MCS information is quality information of received signals received by the terminal from the base station; hence, it is possible to use other information, which can define the quality of received signals such as average SINR (Signal to Interference and Noise Ratio), other than the MCS information representing the quality information of received signals.

In addition, the transmission control circuit 20, which receives the chunk assignment information from the scheduler 19 in the step T5, controls the transmission circuit 20 in accordance with the chunk assignment information by use of the sub-carrier assignment information when transmitting the next transmission frame.

FIG. 14 is a table showing an example of the MCS information used in the present embodiment. The MCS information (numbers 1 to 10) matches modulation systems (QPSK (Quadrature Phase Shift Keying) etc.) and error correction coding rates (⅛ etc.). That is, in connection with transfer speeds (1.942 Mbps etc.) shown in FIG. 14, the MCS information indicates that the terminal requests communication whose transfer speed becomes higher as the number of the MCS information becomes large.

Figure 15:
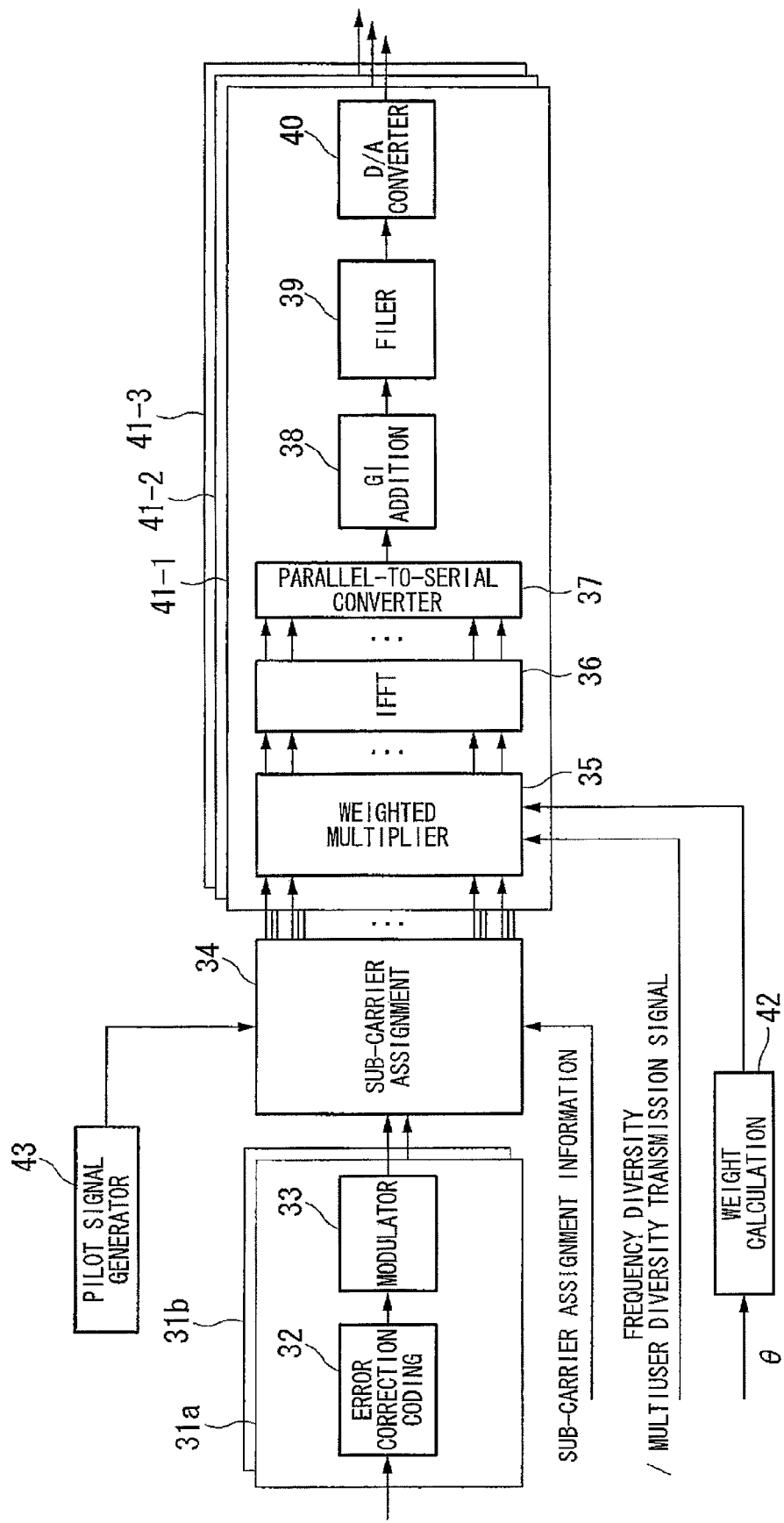
FIG. 15 A diagram for explaining a transmission circuit 21 in the second embodiment.

FIG. 15 is a block diagram showing the constitution of the transmission circuit 21 (FIG. 12) according to the present embodiment. The transmission circuit 21 includes user-dependent signal processors 31a and 31b for performing signal processing dependent upon users. It also includes a pilot signal generator 43 that generates pilot signals, which are used for estimation of propagation paths at terminals, so as to supply them to a sub-carrier assignment section 34. The sub-carrier assignment section 34 assigns the outputs of the user-dependent signal processors 31a and 31b and the output of the pilot signal generator 43 to sub-carriers. Furthermore, it includes antenna-dependent signal processors 41-1, 41-2, and 41-3 for performing signal processing dependent upon transmission antennas.

The user-dependent signal processor 31a includes an error correction coding section 32 for performing error correction coding on transmission data. It also includes a modulator 33 for performing modulation processing such as QPSK and 16QAM (Quadrature Amplitude Modulation) on the output of the error correction coding section.

The outputs of the user-dependent signal processors 31a and 31b are assigned with appropriate sub-carriers by the sub-carrier assignment section 34 based on the sub-carrier assignment information transmitted from the transmission circuit controller 20 (FIG. 12); then, they are supplied to the antenna-dependent signal processors 41-1 to 41-3. The sub-carrier assignment section 34 assigns the output of the pilot signal generator 43 to the position of a common pilot signal (sub-carrier) shown in FIG. 8.

The antenna-dependent signal processor 41-1 includes a weighted multiplier 35 that inputs the output of the sub-carrier assignment section 34 and performs phase rotation θm or multiplication of a weight wm with respect to each sub-carrier so as to output it to an IFFT (Inverse Fast Fourier Transform) section 36. It also includes a parallel-to-serial converter 37 for performing parallel-to-serial conversion on the output of the IFFT section 36. In addition, it includes a GI addition section 38 for imparting a guard interval to the output of the parallel-to-serial converter 37. It further includes a filter 39 for extracting signals of a desired frequency band only from the output of the GI addition section 38. It further includes a D/A converter 40 for performing digital-to-analog conversion on the output of the filter 39.

The antenna-dependent signal processors 41-2 and 41-3 have the same constitution as the antenna-dependent signal processor 41-1, wherein the outputs of the antenna-dependent signal processors 41-1, 41-2, and 41-3 are supplied to the transmission antennas 24, 25, and 26 (FIG. 12) via the radio frequency converter 23 (FIG. 12) for performing frequency conversion into radio frequencies, thus being transmitted as radio signals.

The phase rotation that is imparted by the weighted multiplier 35 is represented as θm=2πfm·(n−1)T. Herein, fm denotes a frequency interval between No. 0 sub-carrier and No. m sub-carrier, wherein it is represented as fm=m/Ts. Ts denotes a symbol length (time) of an OFDM symbol. (n−1)T denotes a circulating delay time applied to No. n transmission antenna in connection with No. 1 transmission antenna 1. A specific sub-carrier is used in a certain chunk. That is, it is used in either the frequency diversity region or the multiuser diversity region, wherein the transmission circuit controller 20 (FIG. 20) for controlling the transmission circuit 20 transmits whether it is used in either the frequency diversity region or the multiuser diversity region by way of the frequency diversity/multiuser diversity transmission signal, based on which the delay time T is changed.

When the weighted multiplier 35 multiplies the weight wm, the weight is set as described below, thus making it possible to perform directivity control. Assuming a linear array of No. n transmission antenna in which a distance between components matches a half the wavelength of a carrier frequency, an example of the weight wm is given by the following equation (1).

[Equation 1]

$$Wm = \frac{1}{\sqrt{n}} \left\{ e^{jk\pi sin\theta(0-\frac{n-1}{2})}, e^{jk\pi sin\theta(1-\frac{n-1}{2})}, \ldots, e^{jk\pi sin\theta((n-1)-\frac{n-1}{2})} \right\} \quad (1)$$

In the above, wm is calculated in the form of vectors indicating weights used in the weighted multiplier 35, wherein the first term indicates a weight used by the first transmission antenna, the second term indicates a weight used by the second transmission antenna, . . . , and the nth term indicates a weight used by the nth transmission antenna.

In the aforementioned wm, n denotes the number of transmission antennas, where n=3 in the present embodiment, wherein θ indicates a main beam direction, and k indicates a ratio between the frequency for transmitting signals and the frequency detected by way of the measurement of θ.

As the main beam direction θ, a value, which is measured by a radio receiver or a counterpart terminal in communication, is transmitted to a weight calculation section 310 and is used in calculation of the weight wm.

FIG. 15 is designed based on a design choice in which the number of users is two, and the number of transmission antennas is three; but a similar constitution can be realized based on other design choices. When specific scramble codes, which depend upon transmission antennas, sectors, and base stations, are applied to signals subjected to transmission via transmission antennas, there is a situation in which one transmission antenna may not simply delay signals of another transmission antenna; however, it is possible to apply the first and second embodiments to such a situation.

Specifically, when specific codes are assigned to different transmission antennas in connection with the antenna-dependent signal processors 41-1, 41-2, and 41-3, specific codes are multiplied by sub-carriers by means of the sub-carrier assignment section 34 and the weighted multiplier 35 shown in FIG. 15 and are then subjected to transmission in connection with different transmission antennas. When the antenna-dependent signal processors 41-1, 41-2, and 41-3 are assigned to different sectors, specific codes are multiplied by sub-carriers by means of the sub-carrier assignment section 34 and the weighted multiplier 35 shown in FIG. 15 and are then subjected to transmission in connection with different sectors. When the antenna-dependent signal processors 41-1, 41-2, and 41-3 are assigned to different base stations, specific codes are multiplied by sub-carriers by means of the sub-carrier assignment section 34 and the weighted multiplier 35 shown in FIG. 15 and are then subjected to transmission in connection with different base stations.

Figure 16:
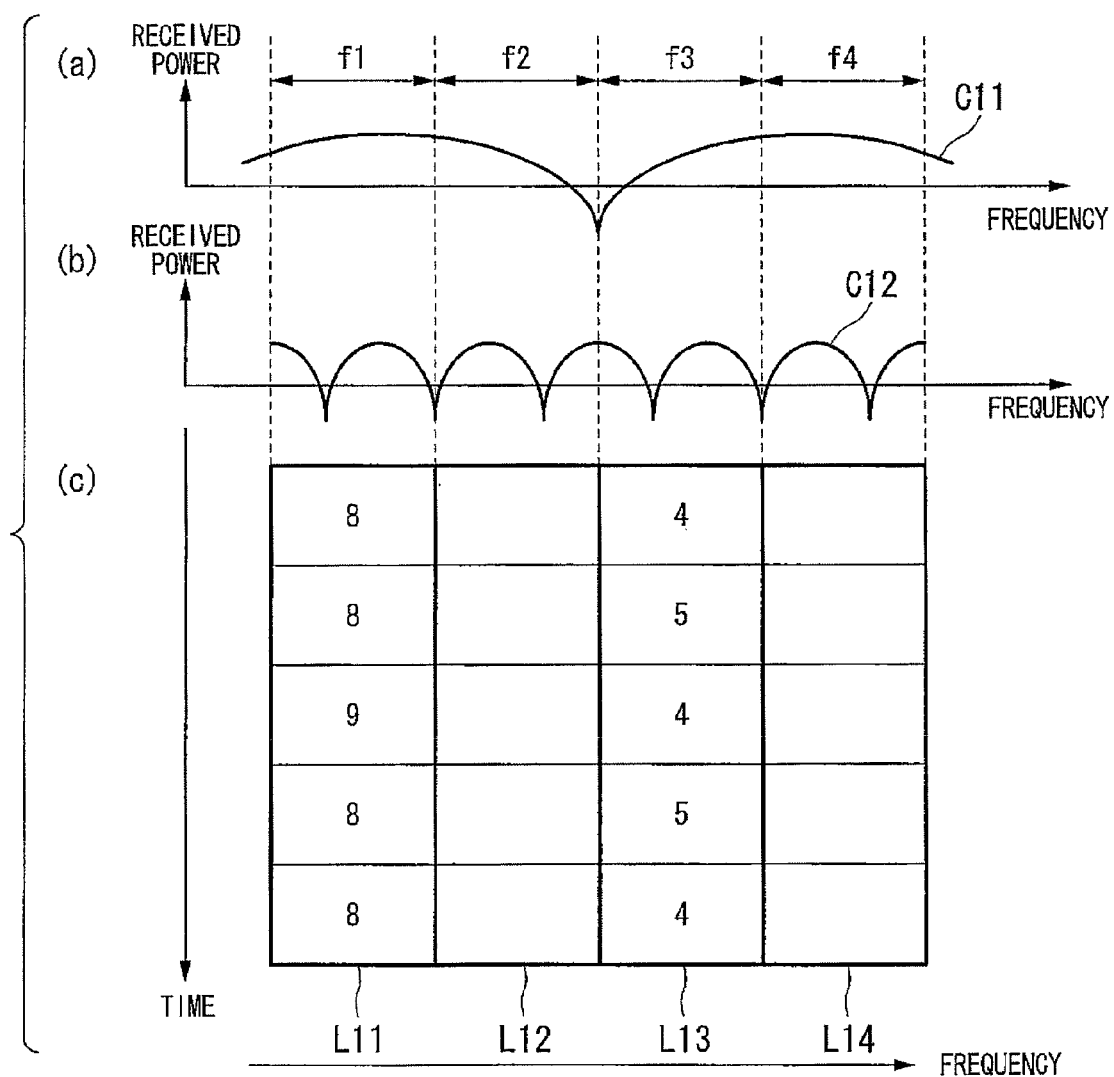
FIG. 16 An illustration for explaining propagation paths monitored by a terminal 12 in the second embodiment and MCS information that is sent to the base station from the terminal 12.

FIG. 16 is an illustration for explaining the method for assigning chunks to terminals based on the information included in CQI from terminals. The following description is given with respect to the foregoing example shown in FIG. 9 in which the base station 11 performs communications with the terminals 12, 13, and 14. The terminal 12 transmits the MCS information (modulation methods requested by terminals and values representing coding rates (FIG. 14)) to the base station as the quality information of received signals representative of chunks included in the multiuser diversity region.

A graph of FIG. 16(a) shows the transfer function C11 monitored in the multiuser diversity region. A graph of FIG. 16(b) shows the transfer function C12 monitored in the frequency diversity region. In the graphs of FIGS. 16(a) and (b), the horizontal axis represents frequency, and the vertical axis represents received power. The graphs of FIGS. 16(a) and (b) show the transfer functions C11 and C12 monitored by the terminal 12 shown in FIG. 9. In the graphs of FIGS. 16(a) and (b), the frequency axis f crosses the received power axis at prescribed values of received power.

An illustration of FIG. 16(c) shows the method for assigning the chunks K1 to K20, which are divided in the frequency axis (horizontal axis) direction and the time axis (vertical axis) direction, to users. Herein, the chunks K1, K5, K9, K13, and K17 form the group L11. The chunks K2, K6, K10, K14, and K18 form the group L12. The chunks K3, K7, K11, K15, and K19 form the group L13. The chunks K4, K8, K12, K16, and K20 form the group L14.

The groups L11 and L13 are set to the multiuser diversity region in advance, and the groups L12 and L14 are set to the frequency diversity region in advance.

The terminal calculates the transfer function of a propagation path by use of a common pilot channel of a chunk included in the group L11, thus monitoring the frequency band f1 in the transfer function C11. In addition, it calculates the transfer function of a propagation path by use of a common pilot signal of a chunk included in the group L12 so as to monitor the frequency band f2 in C12; and it calculates the transfer function of a propagation path by use of a common pilot channel of a chunk included in L13 so as to monitor the frequency band f3 in the transfer function C11. Furthermore, it calculates the transfer function of a propagation path by use of a common pilot channel of a chunk included in the group L14 so as to monitor the frequency band f4 in the transfer function C12.

The situation in which the chunks K1 to K20 are divided into the groups L11 to l14 and are assigned to the multiuser diversity region and the frequency diversity region respectively may be fixed without being changed in the system design; but it can be dynamically changed in response to the conditions of terminals (the number of terminals, the number of high-speed moving terminals, and the amount of information subjected to transmission).

The present embodiment is designed such that the terminal 12 receives signals from the base station by use of the multiuser diversity region; hence, it transmits to the base station the quality information of received signals in the multiuser diversity region only by use of CQI. As shown in FIG. 16(c), the MCS information (modulation methods requested by terminals, and values of coding rates (FIG. 14)) is sent to the base station as the quality information of received signals of chunks included in the groups L11 and L13.

Grouping of the groups L11 and L13 and the groups L12 and L14 in connection with the frequency diversity region and the multiuser diversity region is included in a common control channel (DCCCH: Downlink Common Control Channel), which is transmitted using the header of a transmission frame.

Figure 17:
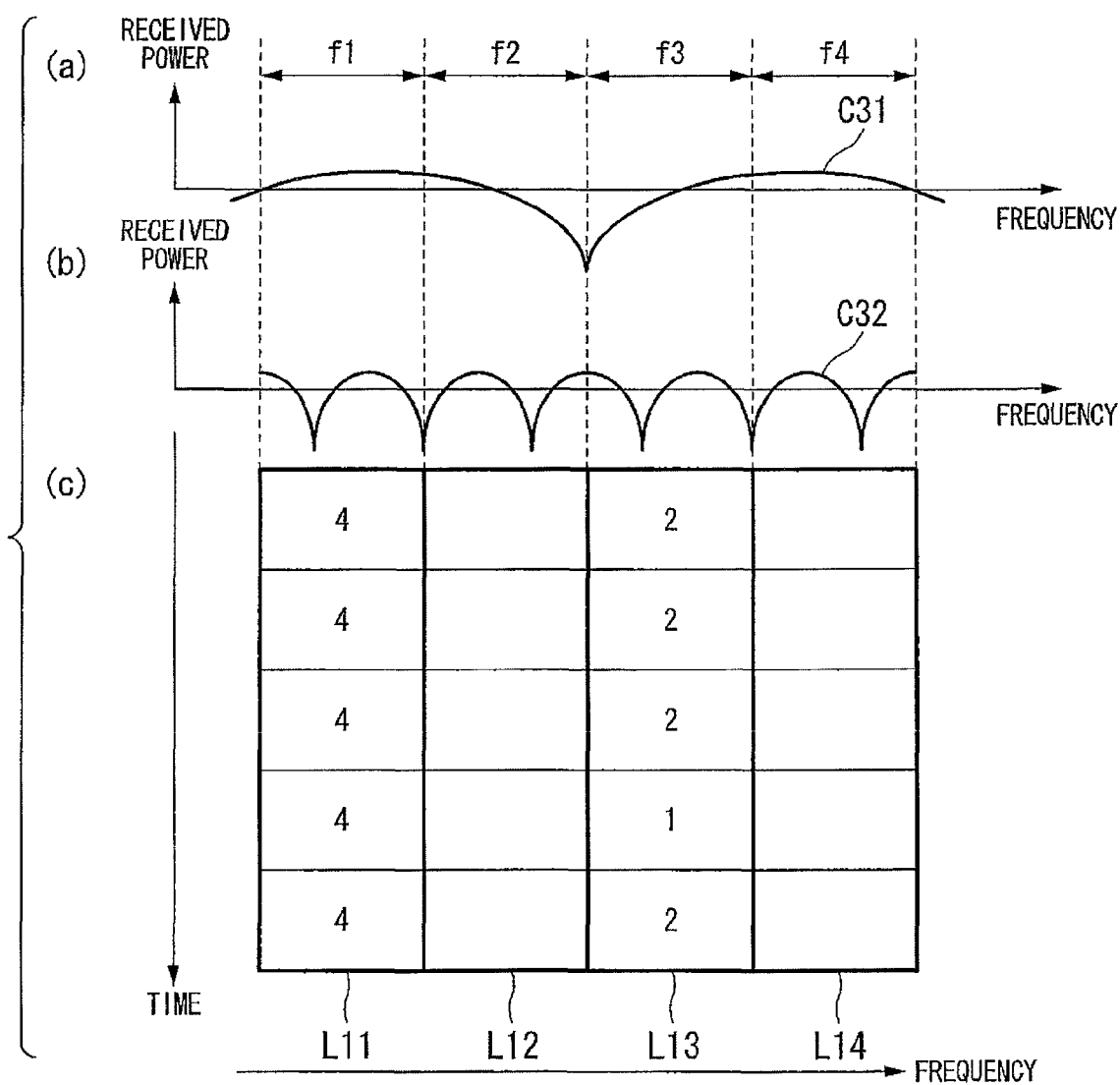
FIG. 17 An illustration for explaining propagation paths monitored by a terminal 13 in the second embodiment and MCS information that is sent to the base station from the terminal 13.
Figure 18:
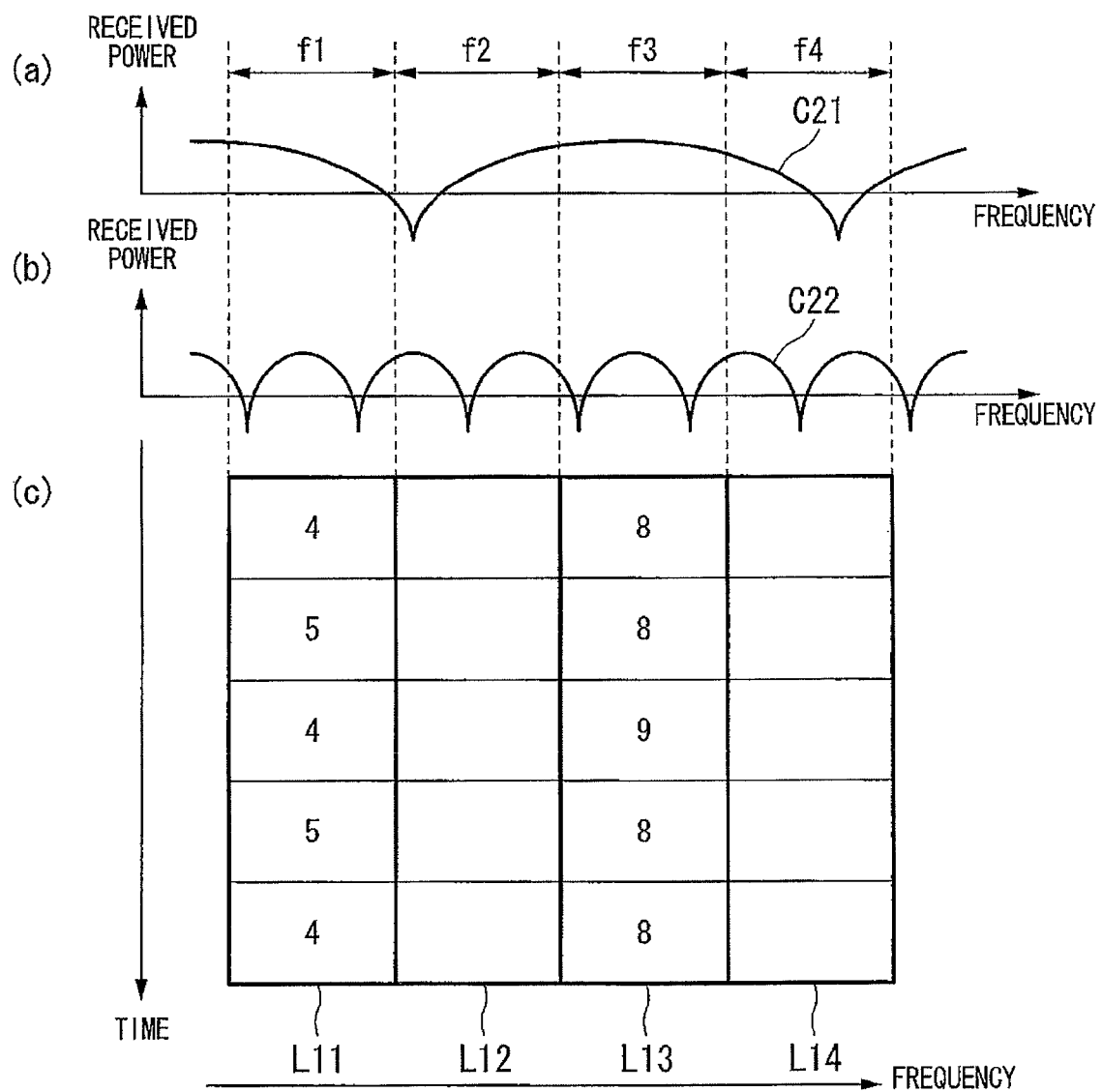
FIG. 18 An illustration for explaining propagation paths monitored by a terminal 14 in the second embodiment and MCS information that is sent to the base station from the terminal 14.

FIGS. 17 and 18 are illustrations for explaining that, in the situation shown in FIG. 9, the terminals 13 and 14 sends the MCS information to the base station as the quality information of received signals of chunks included in the multiuser diversity region. In graphs of FIGS. 17(a) and (b) and graphs of FIGS. 18(a) and (b), the frequency axis f crosses the received power axis at prescribed values of received power.

In the terminal 13, transfer functions C31 and C32 are shaped substantially similar to the transfer functions C11 and C12 shown in FIG. 16; hence, the amount of MCS information becomes larger in the group L11 compared to the group L13 so as to provide a good quality of received signals, but due to the long distance to the base station 11, the distance-dependent attenuation becomes high so that the MCS information has a small value (the graph of FIG. 17(a)).

In the terminal 14, the transfer functions C21 and C22 are shaped differently than the transfer functions C11 and C12 shown in FIG. 16; hence, the amount of MCS information becomes high in the group L13 compared to the group L11 so as to maintain a good quality of received signals (the graph of FIG. 18(a)).

In the step T2 shown in FIG. 13, the base station 11 collects pieces of MCS information shown in FIGS. 16, 17, and 18 from the terminals 12, 13, and 14.

FIG. 19 is a table explaining that, in the step T3 shown in FIG. 13, the base station 11 assigns frequency channels to terminals in order from a terminal having a high transmission speed regarding the MCS information in units of frequencies (f1, f2, f3, and f4).

The following description will be given with respect to the situation in which, in connection with the frequency band f1, the terminal 12 requests an average transmission speed of 8.2, the terminal 13 requests an average transmission speed of 4, and the terminal 14 requests an average transmission speed of 4.4. As shown in FIG. 19, the frequency band f1 is assigned to the terminal 12 at priority 1, the terminal 14 at priority 2, and the terminal 13 at priority 3.

The following description is given such that the terminal requests an average transmission speed of 4.2, the terminal 13 requests an average transmission speed of 1.8, and the terminal 14 requests an average transmission speed of 8.2 in connection with the frequency band f3. As shown in FIG. 19, the frequency band f1 is assigned to the terminal 14 at priority 1, the terminal 12 at priority 2, and the terminal 13 at priority 3.

FIG. 20 is a table for explaining that, in the step T4 shown in FIG. 13, the base station 1 assigns chunks to terminals in a priority order shown in FIG. 19 from a terminal having a high priority and a large amount of MCS information.

The chunk K1 dependent upon the frequency band f1 and the time domain t1 and the chunk K3 dependent upon the frequency band f3 and the time domain t1 are assigned to the terminals 12 and 14 both having priority 1 respectively. In addition, the terminal 13 whose MCS value is low and whose transmission speed is low is assigned with the chunk K5 dependent upon the frequency band f1 and the time domain t2, the chunk K7 dependent upon the frequency band f3 and the time domain t2, the chunk K9 dependent upon the frequency band f1 and the time domain t3, and the chunk K11 dependent upon the frequency band f3 and the time domain t3.

The following description is given such that the same transmission speed is assigned to each terminal with respect to each single transmission frame; but this constitution is not a restriction.

In addition, the following description is given such that the grouping in the steps T2 and T3, i.e. the grouping of terminals dependent upon the MCS information (see FIGS. 16, 17, and 18), is identical to the grouping in the step T4, i.e. the grouping, which is established when communication is performed in accordance with assignment of chunks determined in the step T4 (see FIG. 20); but this constitution is not a restriction.

As described above, after the base station 11 determines and assigns chunks to terminals in the step T4 shown in FIG. 13, assignment of chunks to terminals is sent to the transmission circuit controller 20 in the step T5; hence, the transmission circuit controller 20 controls the transmission circuit 21 to realize this.

Thus, even when the base station applies different delay times to transmission antennas in connection with the frequency diversity region and the multiuser diversity region, the frequency diversity region and the multiuser diversity region are determined in advance, and different delay times are applied to common pilot channels included therein. Afterwards, by performing scheduling in accordance with the CQI information from terminals, it is possible to assign appropriate chunks to terminals and to get adequate multiuser diversity effects.

In particular, the present embodiment is designed such that the terminals 12 and 14 select chunks having good reception qualities so as to perform communication; hence, it is possible to get high multiuser diversity effects.

In addition, the terminal, which performs communication using the frequency diversity region, sends the MCS information using the CQI information to the base station; hence, it is possible to use it for the basis of determination of the scheduling, modulation method, and coding rate of the terminal in downlink communication.

Third Embodiment

The present invention will be described with respect to different grouping of chunks as shown in FIGS. 16, 17, and 18.

The constitution of the base station is shown in FIGS. 12, 13, and 15 in the second embodiment; hence, the description thereof is omitted in the present embodiment. Similarly to the second embodiment, chunks are assigned to terminals based on the information included in CQI from terminals.

Similarly to the second embodiment, as shown in FIG. 9, the following description is given with respect to the situation in which communications are performed between the base station 11 and the terminals 12, 13, and 14.

FIG. 21(a) shows the transfer function C11 monitored in the multiuser diversity region. FIG. 21(b) shows the transfer function C12 monitored in the frequency diversity region. In FIGS. 21(a) and (b), the horizontal axis represents frequency, and the vertical axis represents received power. In the graphs of FIGS. 21(a) and (b), the frequency axis f crosses the received power axis at values of the received power.

A table of FIG. 21(c) shows the method for performing communication by assigning the chunks K1 to K20 to users, wherein the horizontal axis represents frequency, and the vertical axis represents time. Herein, the chunks K1, K2, K3, and K4 form a group L21. The chunks K5, K6, K7, and K8 form a group L22. The chunks K9, K10, K11, and K12 form a group L23. The chunks K13, K14, K15, and K16 form a group L24. The chunks K17, K18, K19, and K20 form a group L25.

The groups L21 and L23 are set to the multiuser diversity region in advance, and the groups L22, L24, and L25 are set to the frequency diversity region in advance.

Therefore, when the terminal calculates the transfer function of a propagation path by use of a common pilot channel of the chunks included in the group L21, it is possible to monitor the frequency bands f1, f2, f3, and f4 with respect to the transfer function C11. In addition, when the terminal calculates the transfer function of a propagation path by use of a common pilot channel of the chunks included in the group L22, it is possible to monitor the frequency bands f1, f2, f3, and f4 with respect to the transfer function C12.

The situation in which the chunks K1 to K20 are divided into the groups L21 to L25 and are assigned to the multiuser diversity region and the frequency diversity region respectively is fixed without being changed in the system design or can be dynamically varied in response to conditions of terminals (the number of terminals, the number of high-speed moving terminals, and the amount of transferred information).

Figure 21:
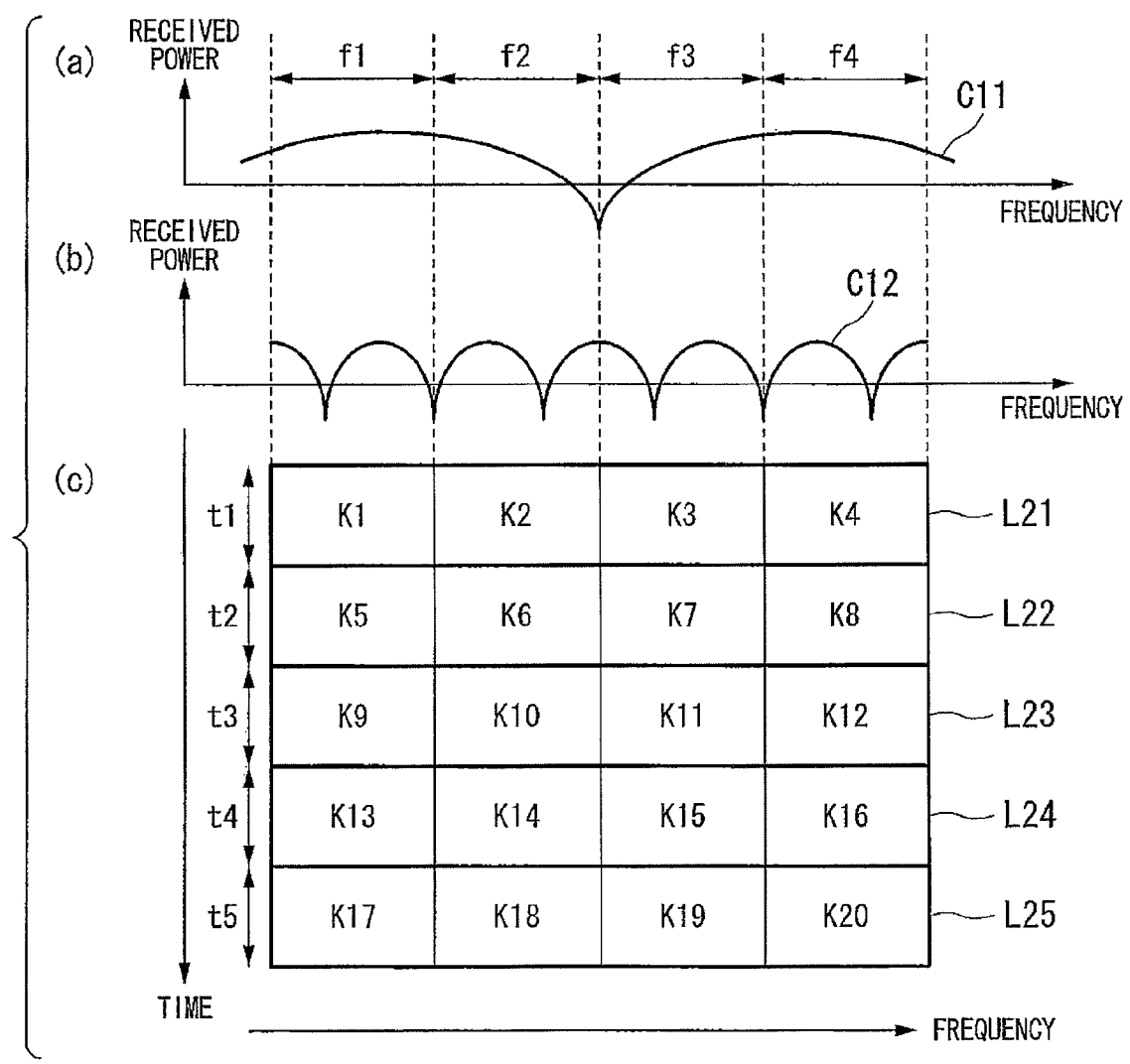
FIG. 21 An illustration for explaining propagation paths monitored by a terminal 12 in a third embodiment and MCS information that is sent to the base station from the terminal 12.
Figure 22:
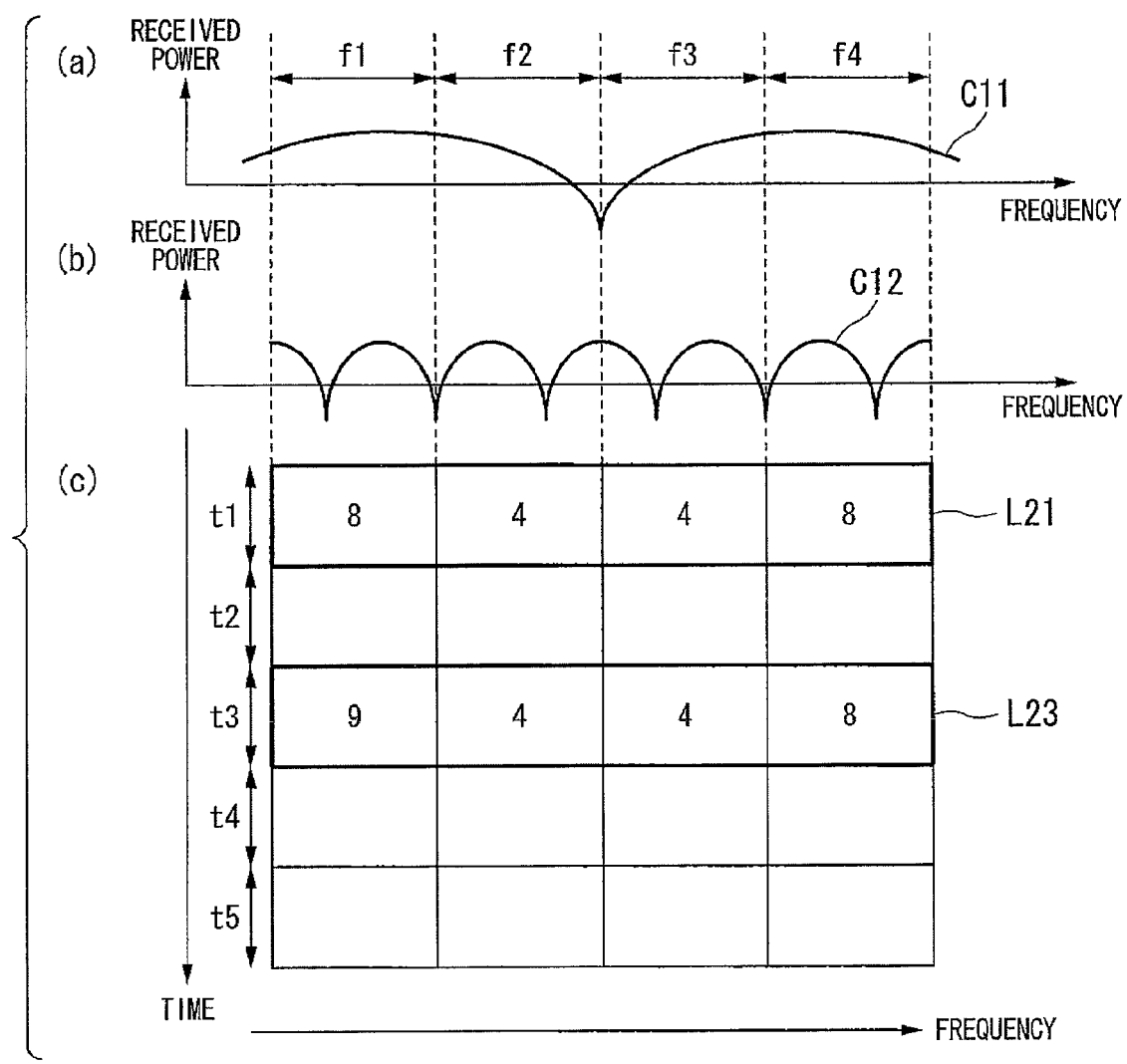
FIG. 22 An illustration for explaining the propagation paths monitored by a terminal 13 in the third embodiment and MCS information that is transmitted from the terminal 13 to the base station.

FIG. 22 is an illustration explaining that the terminal 12 sends the MCS information to the base station as the quality information of received signals of chunks included in the multiuser diversity region in the situation shown in FIGS. 9 and 21.

A graph of FIG. 22(a) shows the transfer function C11 monitored in the multiuser diversity region. A graph of FIG. 22(b) shows the transfer function C12 monitored in the frequency diversity region. In the graphs of FIGS. 22(a) and (b), the horizontal axis represents frequency, and the vertical axis represents received power. The graphs of FIGS. 22(a) and (b) show the transfer functions C11 and C12 that are monitored by the terminal 12 of FIG. 9. In the graphs of FIGS. 22(a) and (b), the frequency axis f crosses the received power axis at prescribed values of the received power.

FIG. 22(c) is table for explaining the method for performing communication by assigning the chunks K1 to K20 to users, wherein the horizontal axis represents frequency, and the vertical axis represents time. Herein, as shown in FIG. 21, the chunks K1 to K20 are assigned to the groups L21 to L25, wherein the groups L21 and L23 are set to the multiuser diversity region in advance, and the groups L22, L24, and L25 are assigned to the frequency diversity region in advance.

Therefore, when the terminal calculates the transfer function of a propagation path by use of a common pilot channel of the chunks included in the groups L21 and L23, it is possible to monitor the frequency bands f1, f2, f3, and f4 with respect to the transfer function C11.

In the present embodiment, the terminal 12 serving as a radio receiver receives signals from the base station serving as a radio transmitter by use of the multiuser diversity region, so that it transmits to the base station only the quality information of received signals in the multiuser diversity region by use of CQI.

As shown in the table of FIG. 22(c), the MCS information (modulation methods requested by terminals, and values of coding rates (FIG. 14)) is sent to the base station as the quality information of received signals of the chunks included in the groups L21 and L23.

Grouping of the groups L21 and L23 and the groups L22, L24, and L25 in connection with the frequency diversity region and the multiuser diversity region is included in a common control channel that is transmitted using the header of a transmission frame.

Figure 23:
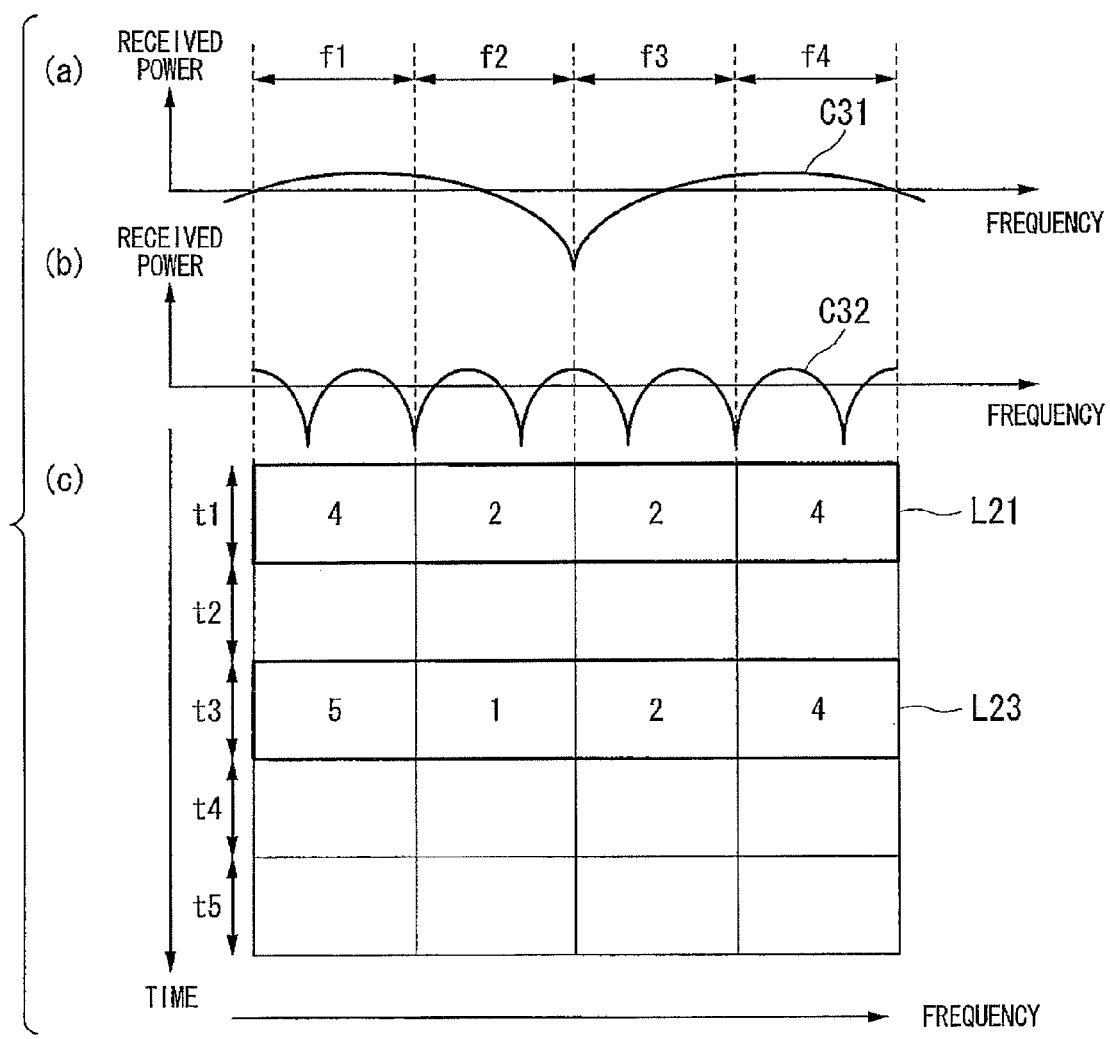
FIG. 23 An illustration for explaining the propagation paths monitored by a terminal 14 in the third embodiment and MCS information that is transmitted from the terminal 14 to the base station.
Figure 24:
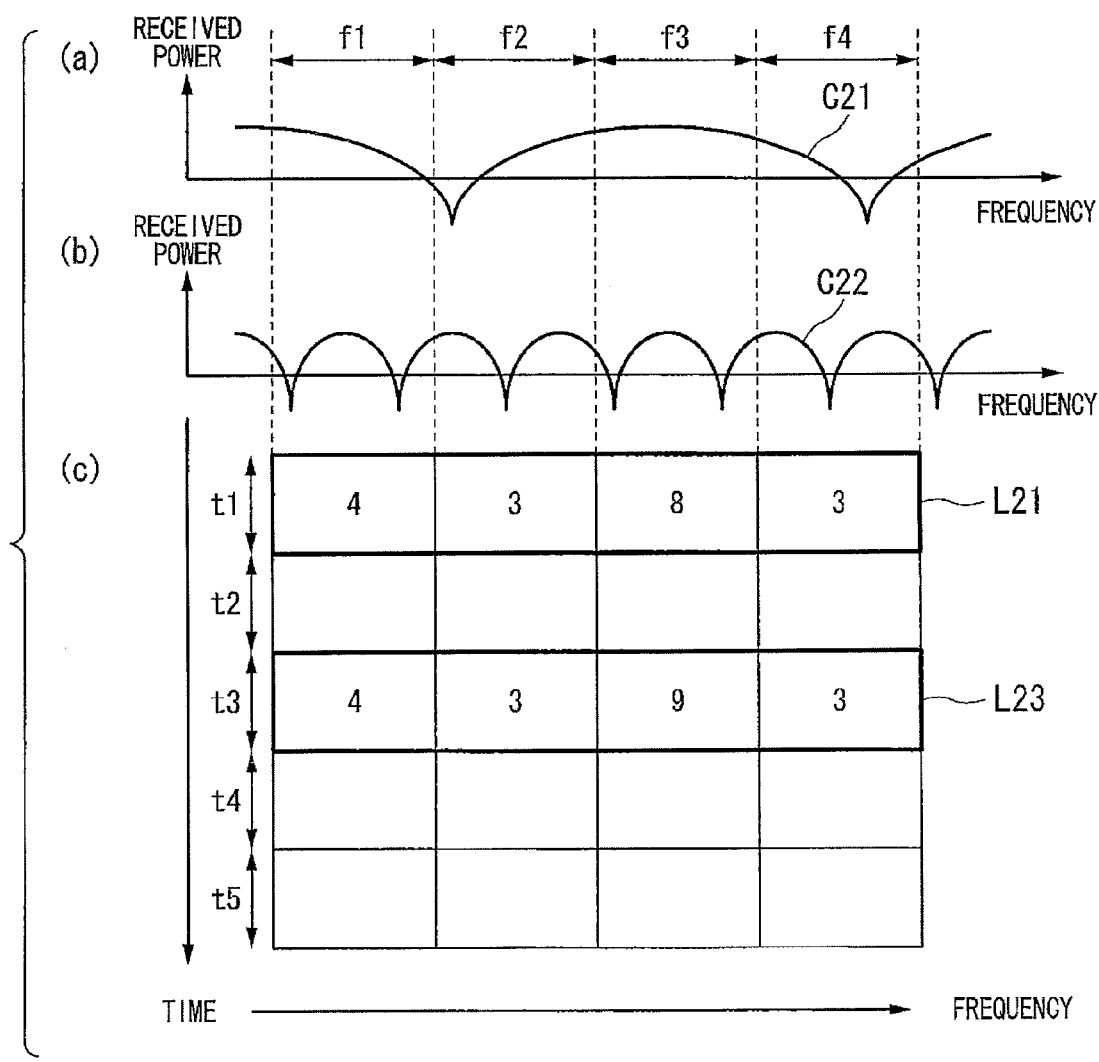
FIG. 24 An illustration for explaining the operation of the scheduler 19 in the third embodiment.

FIGS. 23 and 24 are illustrations explaining the situation shown in FIG. 9, in which the terminals 13 and 14 transmits to the base station the MCS information as the quality information of received signals of chunks included in the multiuser diversity region. In graphs of FIGS. 23(a) and (b) and graphs of FIGS. 24(a) and (b), the frequency axis f crosses the received power axis at prescribed values of the received power.

In the terminal 13, transfer functions C31 and C32 are shaped substantially identical to the transfer functions C11 and C12 shown in FIG. 22; hence, compared to the group L23, the group L21 presents a larger amount of the MCS information so as to demonstrate good quality of received signals.

However, due to the long distance from the base station 11, distance-dependent attenuation becomes large so that the MCS information becomes small.

In the terminal 14, the transfer functions C21 and C22 are shaped differently of the transfer functions C11 and C12 shown in FIG. 22; hence, compared to the group L11, the group L13 presents a larger amount of the MCS information so as to demonstrate good quality of received signals.

In the step T2 of FIG. 13, the base station 11 collects pieces of the MCS information from the terminals 12, 13, and 14 as shown in FIGS. 22, 23, and 24.

Figure 25:
FIG. 25 A table for explaining the operation of the scheduler 19 in the third embodiment.

FIG. 25 is a table explaining the method where the base station assigns frequency channels to terminals in order from a terminal having a high transfer speed of the MCS information in units of frequencies (f1, f2, f3, and f4) in the process of step T3 shown in FIG. 13.

The following description is given with respect to the situation in which the terminal 12 requests an average transmission speed of 8.5, the terminal 13 requests an average transmission speed of 4.5, and the terminal 14 requests an average transmission speed of 4 in the frequency band f1. In the frequency band f1, priority 1 is assigned to the terminal 12, priority 2 is assigned to the terminal 13, and priority 3 is assigned to the terminal 14.

The following description is given with respect to the situation in which the terminal 12 requests an average transmission speed of 4, the terminal 13 requests an average transmission speed of 1.5, and the terminal 14 requests an average transmission speed of 3 in the frequency band f2. In the frequency band f2, priority 1 is assigned to the terminal 12, priority 2 is assigned to the terminal 14, and priority 3 is assigned to the terminal 13.

Similarly, priority 1 is assigned to the terminal 14, priority 2 is assigned to the terminal 12, priority 3 is assigned to the terminal 13 in the frequency band f3. In addition, priority 1 is assigned to the terminal 12, priority 2 is assigned to the terminal 13, and priority 3 is assigned to the terminal 14 in the frequency band f4.

Figure 26:
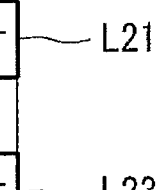
FIG. 26 A table for explaining the operation of the scheduler 19 in the third embodiment.

FIG. 26 is a table explaining that the base station assign chunks to terminals in order from a terminal whose priority is high and whose MCS information is large in accordance with the priorities shown in FIG. 25.

The terminal 12 and the terminal 14 both having priority 1 are assigned with the chunk K1 dependent upon the frequency band f1 and the time domain t1, the chunk K3 dependent upon the frequency band f3 and the time domain t1. The terminal 13 whose MCS value is low and whose transmission speed is low is assigned with the chunk K4 dependent upon the frequency band f4 and the time domain t1, the chunk K9 dependent upon the frequency band f1 and the time domain t3, and the chunk K12 dependent upon the frequency band f4 and the time domain t3.

The aforementioned description is given with respect to the case in which the same data transmission speed is assigned to each terminal per each single transmission frame; but this case is not a restriction.

Grouping is described with respect to the grouping in the step T2 and T3, i.e. the grouping dependent upon the MCS information determined by the terminal (see FIGS. 22, 23, and 24), and to the grouping in the step T4, i.e., the grouping that is established when performing communication in accordance with the chunk assignment determined by the step T4 (see FIG. 26); but this is not a restriction.

As described above, after the base station 11 selects chunks assigned to terminals in the step T4 of FIG. 13, the assigned chunks of terminals are transmitted to the transmission circuit controller 20 in the step T5; hence, in order to achieve this, the transmission circuit controller 20 controls the transmission circuit 21.

Thus, even when the base station imparts different delay times to transmission antennas in connection with the frequency diversity region and the multiuser diversity region, scheduling is performed in accordance with the CQI information from terminals so that appropriate chunks are assigned to terminals so as to get adequate multiuser diversity effects since the frequency diversity region and the multiuser diversity region are determined in advance, and different delay times are imparted to common pilot channels included therein.

In particular, the present embodiment is designed such that the terminals 12 and 14 select chunks having good reception qualities so as to perform communication, thus achieving high multiuser diversity effects.

In addition, the terminal, which performs communication by use of the frequency diversity region, transmits to the base station the MCS information by use of CQI, which can be used for the determination of the scheduling and modulation method of the terminal and the coding rate in downlink communication.

Fourth Embodiment

The present embodiment is described with respect to different groupings of chunks as shown in FIGS. 16, 17, and 18.

The constitution of the base station is already described in the second embodiment as shown in FIGS. 12, 13, and 15; hence, the description thereof is omitted in the present embodiment.

Similar to the second embodiment, the following description is given with respect to the situation as shown in FIG. 9 in which communications are performed between the base station 11 serving as a radio transmitter and the terminals 12, 13, and 14 serving as radio receivers.

A graph of FIG. 27(a) shows the transfer function C11 monitored in the multiuser diversity region. A graph of FIG. 27(b) shows the transfer function C12 monitored in the frequency diversity region. In the graphs of FIGS. 27(a) and (b), the horizontal axis represents frequency, and the vertical axis represents received power. The graphs of FIGS. 27(a) and (b) show the transfer functions C11 and C12 that are monitored by the terminal 12. In the graphs of FIGS. 27(a) and (b), the frequency axis f crosses the received power axis at prescribed values of the received power.

FIG. 27(c) is a table for explaining the method for performing communication by assigning the chunks K1 to K20 to users, wherein the horizontal axis represents frequency, and the vertical axis represents time. It differs from FIG. 10 in terms of the grouping of the chunks K1 to K20. That is, the chunks K1, K2, K3, and K4 form the group L31. The chunks K5, K6, K9, and K10 form the group L32. The chunks K7, K8, K11, and K12 form the group L33. The chunks K13, K14, K17, and K18 form the group L34. The chunks K15, K16, K19, and K20 form the group L35.

The groups L32 and L35 are set to the multiuser diversity region in advance, and the groups L31, L33, and L34 are set to the frequency diversity region in advance.

Therefore, when the terminal calculates the transfer function of a propagation path by use of a common pilot channel of the chunks included in the group L31, it is possible to monitor the frequency bands f1, f2, f3, and f4 with respect to the transfer function C12. When it calculates the transfer function of a propagation path by use of a common pilot channel of the chunks included in the group L32, it is possible to monitor the frequency bands f1 and f2 with respect to the transfer function C11.

The situation in which the chunks K1 to K20 are divided into the groups L31 to L35 and are assigned to the multiuser diversity region and the frequency diversity region respectively is fixed without being changed in the system design or can be dynamically changed in response to conditions of terminals (the number of terminals, the number of high-speed moving terminals, and the amount of transferred information).

Figure 27:
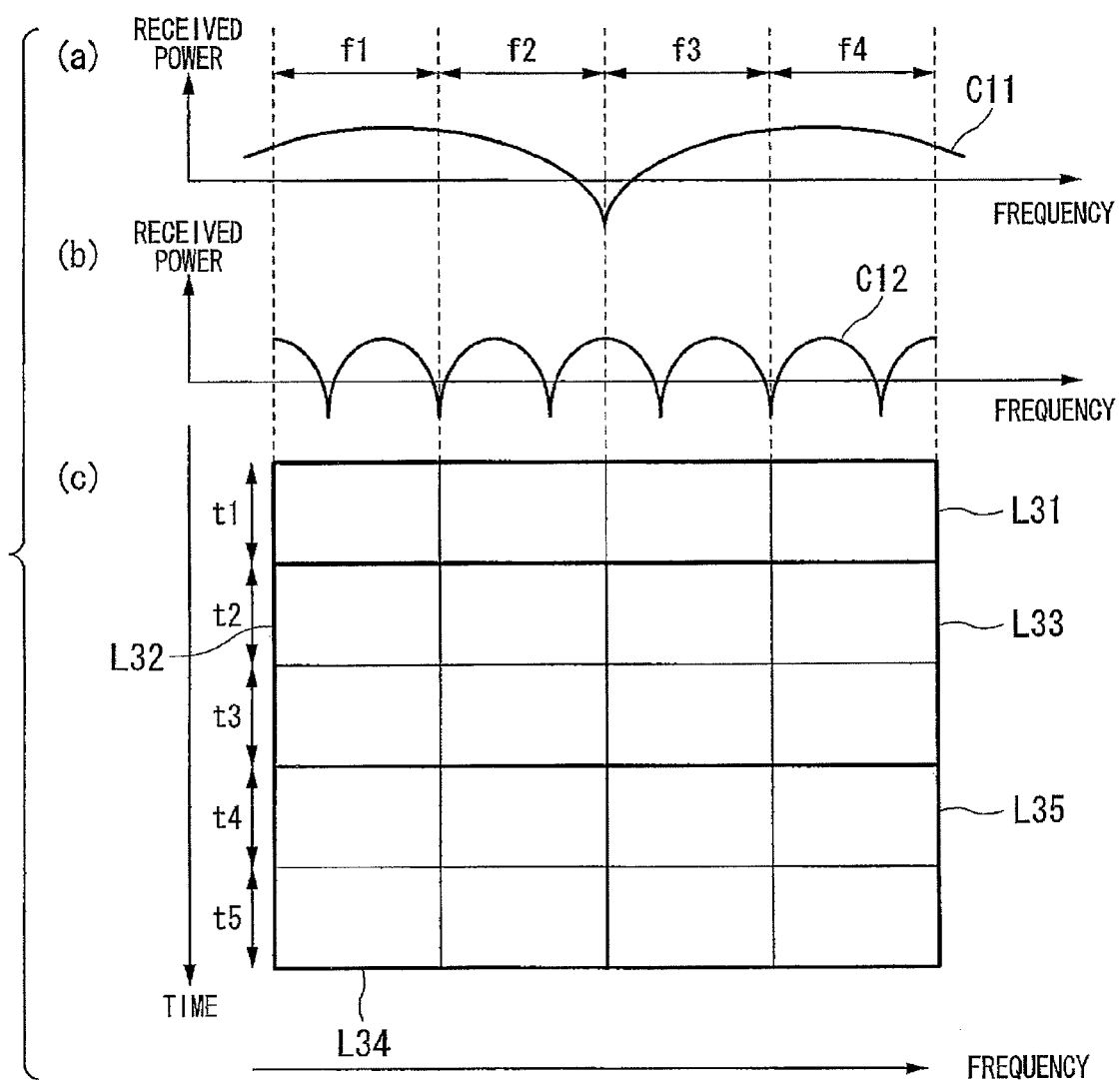
FIG. 27 An illustration for explaining grouping of chunks and propagation paths monitored by the terminal 12 in a fourth embodiment.

The present embodiment employs different grouping of chunks as shown in FIG. 27, wherein as similar to the second and third embodiments, the chunks K1 to K20 are divided into groups in advance and are assigned to the multiuser diversity region and the frequency diversity region respectively so that the transfer functions are monitored using common pilot channels included in groups so as to monitor qualities of received signals, based on which the base station performs scheduling so as to assign appropriate chunks to terminals, thus achieving adequate multiuser diversity effects.

The first to fourth embodiments are described such that the groups included in the frequency diversity region and the multiuser diversity region are not changed, and the same grouping is applied to the next transmission frame (see FIG. 20 or FIG. 26) based on the information obtained by the steps T2 and T3 of FIG. 13 (see FIGS. 16, 17, and 18 or FIGS. 22, 23, and 24), then, the chunk assignment is performed in the step T4, whereas it is possible to change the grouping of chunks in the step T4 such that a different grouping is assigned to the next transmission frame. For example, it is possible to assign chunks to terminals in the step T4 in accordance with the grouping shown in FIG. 21 based on assignment results of terminals.

FIG. 28 is a table for explaining chunks in the fourth embodiment. In the situation shown in FIG. 19 in which, after priorities are determined in units of frequencies in the step T3 of FIG. 13, chunks are assigned in accordance with the grouping of FIG. 21 different from FIG. 19, the terminals 12 and the terminal 14 both having priority 1 are assigned with the chunk K1 dependent upon the frequency band f1 and the time domain t1 and the chunk K3 dependent upon the frequency band f3 and the time domain t1 respectively. The terminal 13 whose MCS value is low and whose transmission speed is low is assigned with the chunk K9 dependent upon the frequency band f1 and the time domain t3 and the chunk K11 dependent upon the frequency band f3 and the time domain t3.

Thus, even when the base station applies different delay times to transmission antennas in connection with the frequency diversity region and the multiuser diversity region, scheduling is performed in accordance with the CQI information from terminals so that appropriate chunks are assigned to terminals so as to achieve adequate multiuser diversity effects since the frequency diversity region and the multiuser diversity region are determined in advance, and different delay times are applied to common pilot channels included therein. In this connection, when the terminal measures the quality of received signals so as to obtain the CQI information, and when the base station performs scheduling so as to perform transmission, the frequency diversity region and the multiuser diversity region can be composed of different chunks.

In particular, the present embodiment is designed such that the terminals 12 and 14 select chunks having good reception qualities so as to perform communication, thus achieving high multiuser diversity effects.

In Evolved UTRA & UTRAN studied in 3GPP (3rd Generation Partnership Project), there are provided common pilot channels (Downlink Common Pilot Channel), Dedicated Pilot channels (Downlink Dedicated Pilot Channel), downlink synchronization channels (Downlink Synchronization Channel), common control channels (Downlink Common Control Channel), shared control channels (Downlink Shared Control Channel), common data channels (Shared Data Channel), and multicast/broadcast channels (Multicast/Broadcast Channel) as main physical channels.

Common pilot channels DCPCH correspond to common pilot channels in the W-CDMA (Wideband Code Division Multiple Access) system, wherein they are used for estimation of conditions of downlink propagation paths, cell searches, and measurement of losses of propagation paths in uplink transmission power control.

Dedicated pilot channels DDCH are transmitted to individual mobile stations via transmission antennas whose propagation paths (directivities) differ from those of cell shared antennas such as adaptive array antennas, wherein they can be used for the purpose of reinforcing downlink common pilot channels DCPCH in mobile stations having low reception qualities.

Downlink synchronization channels DSCH correspond to synchronization channels SCH of the W-CDMA system, wherein they are used for cell searches of mobile stations, radio frames of OFDM signals, time slots, transmission timing intervals TTI (Transmission Timing Interval), and synchronization of OFDM symbol timing.

Common control channels DCCCH include pieces of common control information such as broadcast information (corresponding to broadcast channels) corresponding to first common control physical channels P-CCPCH, second common control physical channels S-CCPCH, and paging indicator channels PICH in the W-CDMA system, packet paging indicator PI information (corresponding to paging indicator channels PICH) indicating existence of packet calls, packet paging information corresponding to packet calls (corresponding to paging channels PCH), and downlink access information (corresponding to downlink access channels FACH).

Shared control signaling channels DSCSCH correspond to shared control channels HS-SCCH regarding HS-DSCH included in high-speed physical downlink shared channels HS-PDSCH of the HSDPA (High Speed Downlink Packet Access) system, downlink dedicated control channels DPCCH, and acquired indicators AICH, wherein they are shared by multiple mobile stations and are used for transmission of information (modulation methods, spread coding, etc.) required for demodulation of high-speed downlink shared channels HS-DSCH in each mobile station, information required for error connection decoding and HARQ process, and scheduling information of radio resource (frequency, time).

Downlink shared data channels DSDCH correspond to high-speed downlink shared channels HS-DSCH included in high-speed physical downlink shared channels HS-PDSCH of the HSDPA system and downlink dedicated data channels DPDCH, wherein they are used for transmission of packet data from the upper layer to the mobile station.

Multicast/broadcast channels are used for transmission of information signals.

Figure 10:
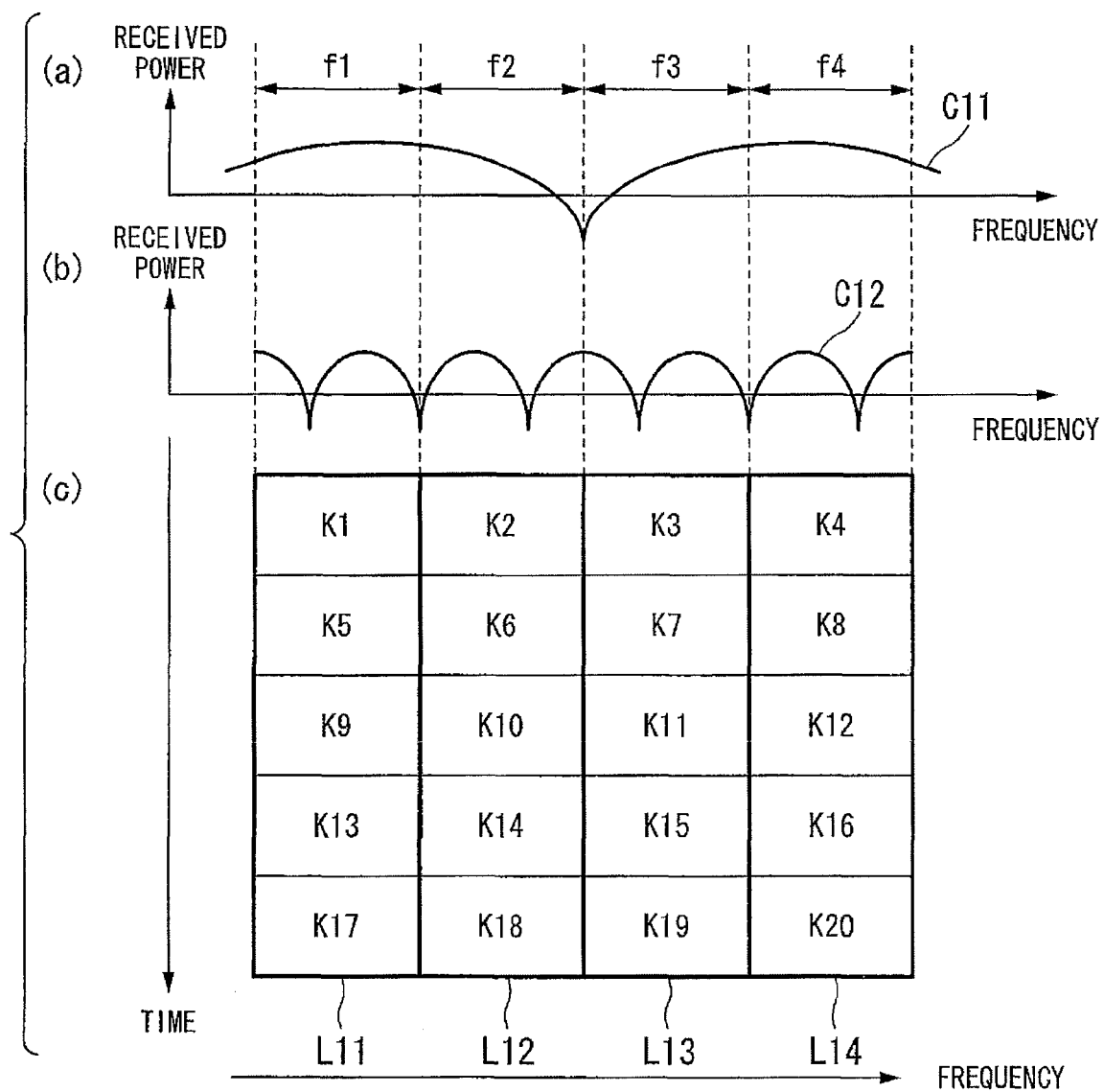
FIG. 10 An illustration for explaining grouping of chunks and propagation paths monitored by a terminal 12 in the first embodiment.
Figure 11:
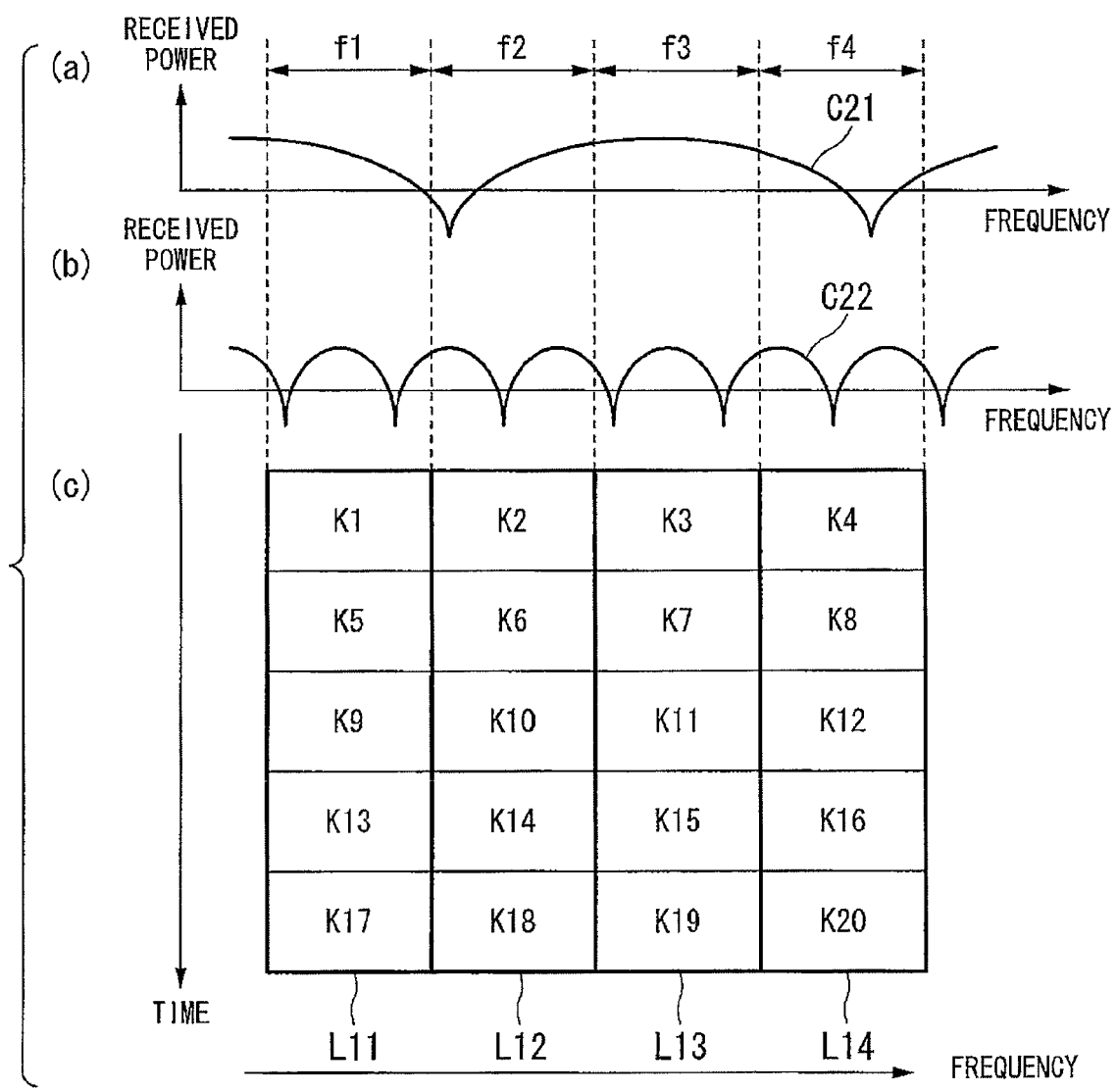
FIG. 11 An illustration for explaining grouping of chunks and propagation paths monitored by a terminal 14 in the first embodiment.
Figure 29:
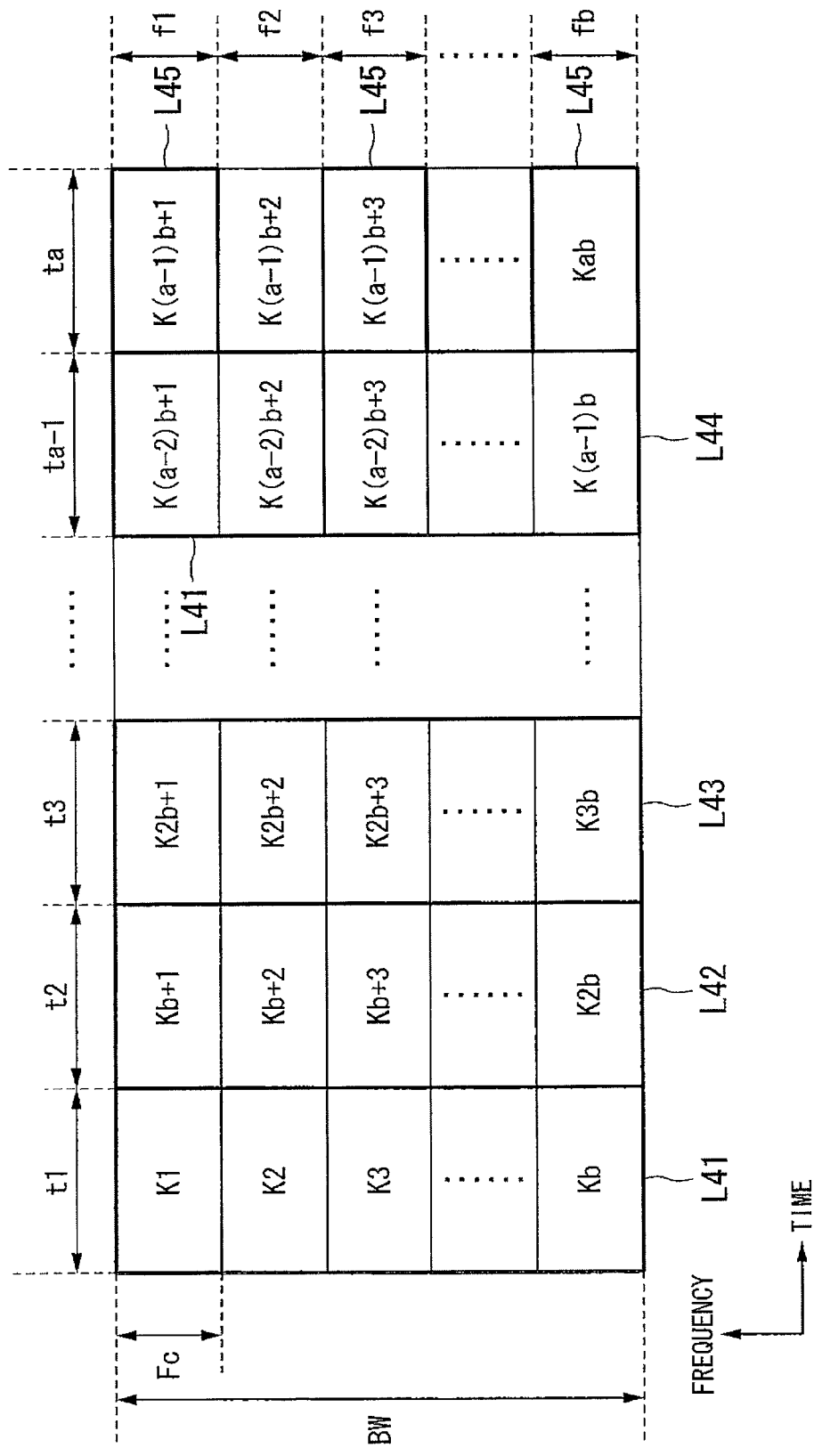
FIG. 29 An illustration for explaining chunks in the fourth embodiment.

FIG. 29 is an illustration showing the configuration of a transmission frame equivalent to that of FIG. 10 in consideration of each physical channel and the configuration of a transmission frame. In FIG. 29, the vertical axis represents frequency, and the horizontal axis represents time, wherein "a" transmission times t1 to ta are set to the horizontal axis, and "b" transmission frequencies are set to the vertical axis. The transmission frame is configured by a×b chunks K1 to Kab. Herein, BW denotes a transmission frequency bandwidth used for the transmission of a transmission frame, and Fc denotes a frequency bandwidth of a chunk.

Figure 30:
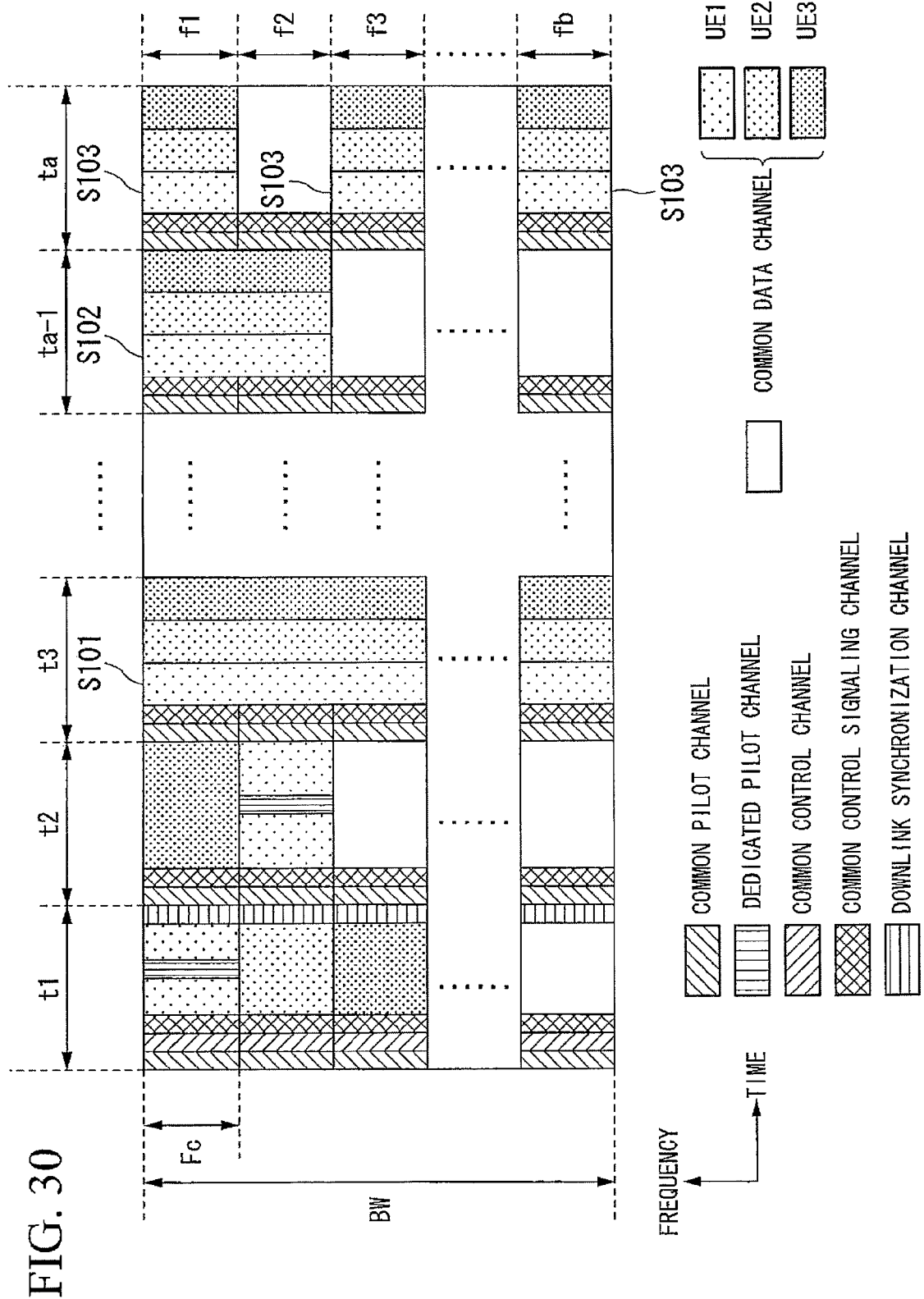
FIG. 30 An illustration for explaining the arrangements of assignment slots and physical channels in the fourth embodiment.
Figure 31:
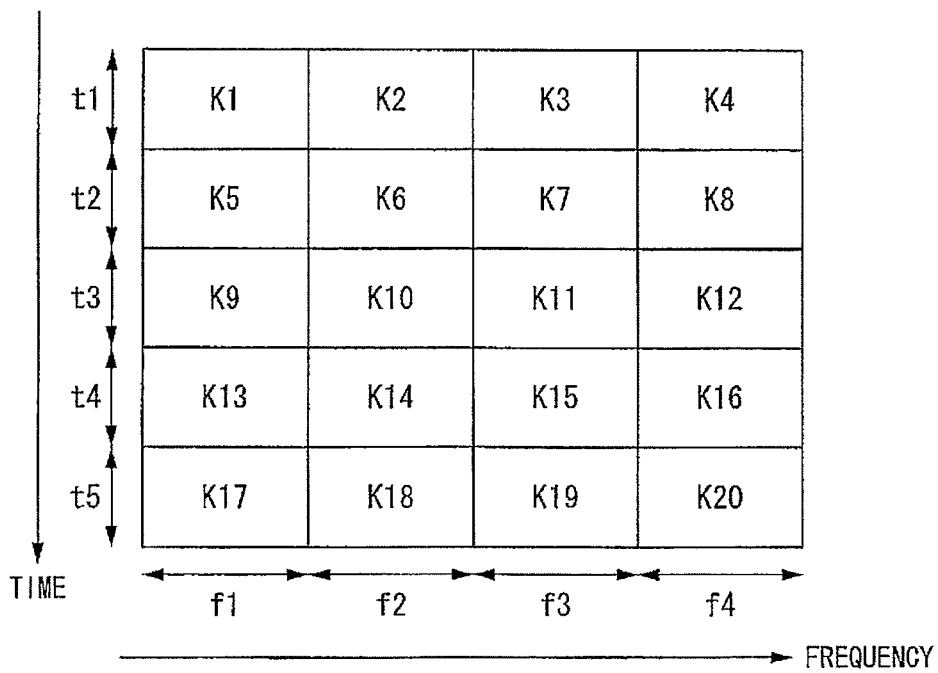
FIG. 31 An illustration showing chunks regarding signals that are transmitted from a conventionally-known radio transmitter to a radio receiver.
Figure 32:
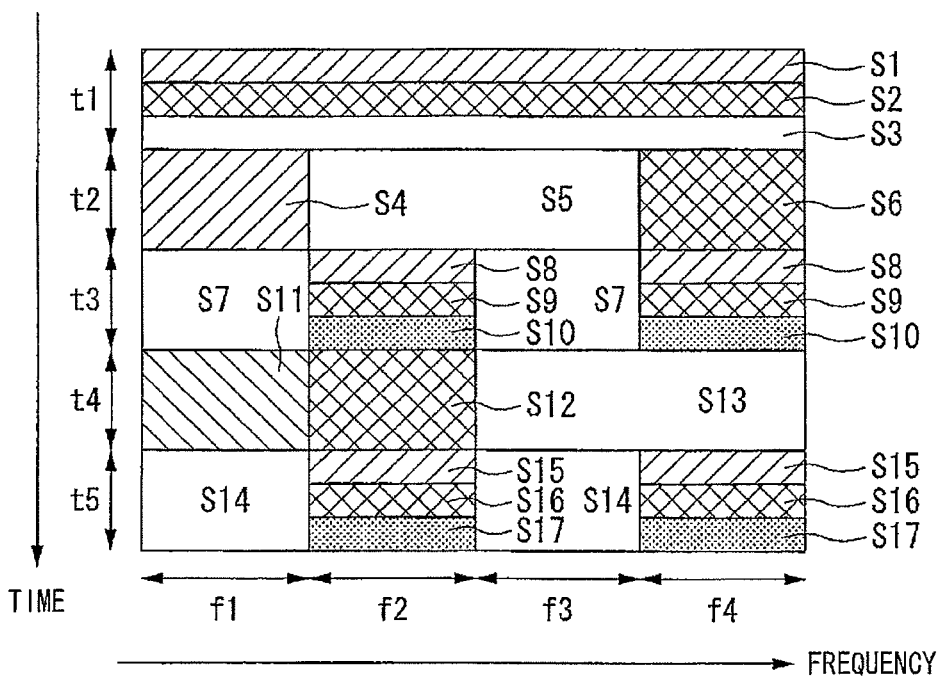
FIG. 32 An illustration showing assignment slots regarding signals that are transmitted from the conventionally-known radio transmitter to the radio receiver.

FIG. 30 is an illustration showing an example of assignment for assigning each physical channel to each chunk in the configuration of a transmission frame shown in FIG. 29. In FIG. 30, a common pilot channel is assigned to the headers of the chunks K1 to Kab (first OFDM symbols in time). Common control channels and downlink synchronization channels are transmitted using a part of the chunks included in the transmission time t1 and using the transmission frequency bandwidth BW. A common control channel is assigned to each chunk, wherein three terminals UE1 to UE3 are assigned as the common data channel, wherein, for example, the terminal UE1 is assigned to the chunks K1 and Kb+2, and wherein it shows that the chunks K2b+1 to K3b are coupled and transmitted using a single assignment slot 5101 within three slots dividing the transmission time t3; it shows that the chunks K(a−2)b+1 to K(a−2)b+2 are coupled and transmitted using a single assignment slot S102 within three slots dividing the transmission time ta−1; and it shows that the chunks K(a−1)b+1, K(a−1)b+3, . . . , and Kab lying in the frequency axis are alternately coupled and transmitted using a single assignment slot S103 within three slots dividing the transmission time ta.

When the chunks K1 to Kb forming the group L41 are used in the frequency diversity region, it is possible to get frequency diversity effects as shown in FIG. 30 with respect to common control channels included in the group L41, common control signaling channels, downlink synchronization channels, and common data channels addressing the terminals UE1, UE2, and UE3 assigned to the chunks K1, K2, and K3.

Similarly, when the chunks Kb+1 to K2b forming the group L42 are used in the multiuser diversity region, it is possible to get multiuser diversity effects in common control signaling channels and common data channels addressing the terminals UE3 and UE1 assigned to the chunks Kb+1 and Kb+2 by use of the methods described in the first to third embodiments.

Similarly, it is possible to get frequency diversity effects in common control signaling channels and common data channels with respect to the group L43 assigned with the chunks K2b+1 to K3b; and it is possible to get frequency diversity effects in common control signaling channels and common data channels with respect to the group L45 assigned with the chunks K(a−1)b+1, K(a−1)b+3, . . . , and Kab lying in the frequency axis direction alternately.

As described above, by using the methods described in the first to fourth embodiments, as shown in FIG. 30, it is possible to get frequency diversity effects or multiuser diversity effects in all physical channels.

In the aforementioned embodiments, it is possible to store programs achieving all the functions or a part of the functions of the delay sections 5 and 6 in FIG. 1, the PDCP section 15, the RLC section 16, the MAC section 17, the physical layer 18, the scheduler 19, the transmission circuit controller 29, the transmission circuit 21, the reception circuit 22, and the radio frequency converter 23 in FIG. 12, and the error correction coding section 32, the modulator 33, the sub-carrier assignment section 34, the weighted multiplier 35, the IFFT section 36, the parallel-to-serial converter 37, the GI addition section 38, the filter 29, the D/A converter 40, the weight calculation section 42, and the pilot signal generator 43 in FIG. 15 in computer-readable storage media. Then, programs stored in storage media are loaded into the computer system and are executed so as to control the radio transmitter. The computer system embraces the OS and the hardware of peripheral devices.

Computer-readable storage media mention flexible disks, magneto-optical disks, ROM, portable media such as CD-ROM, and storage devices such as hard disks incorporated in the computer system. In addition, computer-readable storage media embrace communication lines, which dynamically retain programs in short time periods when programs are transmitted via networks such as the Internet and via communication lines such as telephone lines, as well as volatile memories of the computer system serving as the server and client, which retain programs at certain times. The aforementioned programs can be realized using a part of the aforementioned functions, or they can be realized by combining the aforementioned functions with programs pre-stored in the computer system.

As described heretofore, the embodiments of this invention are described in detail with reference to the drawings; but specific constitutions are not necessarily limited to the embodiments; hence, it is possible to embrace designs not departing from the essentials of this invention.

INDUSTRIAL APPLICABILITY

The present invention is applicable to radio transmitters, radio communication systems, and radio transmission systems for transmitting signals to radio receivers via multiple transmission antennas, wherein by assigning communication times or communication frequencies to radio receivers based on the quality information of received signals transmitted by the radio receivers, it is possible to get very high multiuser diversity effects and to improve communication quality.

The invention claimed is:

1. A terminal apparatus for use in a communication system, the terminal apparatus comprising:
    a receiving circuit configured to and/or programmed to receive, from a base station, signals based on a mode which is selected from a plurality of modes, the plurality of modes including at least a first mode to be capable of applying a phase rotation difference to signals between adjacent subcarriers at least in a transmitting antenna and a second mode not to be capable of applying the phase rotation difference, and
    a transmitting circuit configured to and/or programmed to transmit a Channel Quality Indicator (CQI) depending on the mode selected.

2. The terminal apparatus according to claim 1, wherein a maximum value of the phase rotation difference to signals between adjacent subcarriers is larger than $2\pi/(Fc \times Ts)$, where Fc denotes a frequency band width of a chunk, where the chunk is defined as consecutive Orthogonal Frequency Division Multiplexing (OFDM) symbols in a time domain and consecutive subcarriers in a frequency domain, Ts denotes a length of time for an OFDM symbol.

3. A communication method of a terminal apparatus for use in a communication system, the communication method comprising:
    receiving, from a base station, signals based on a mode which is selected from a plurality of modes, the plurality of modes including at least a first mode to be capable of applying a phase rotation difference to signals between adjacent subcarriers at least in a transmitting antenna and a second mode not to be capable of applying the phase rotation difference, and transmitting a Channel Quality Indicator (CQI) depending on the mode selected.

4. The communication method according to claim 3, wherein a maximum value of the phase rotation difference to signals between adjacent subcarriers is larger than $2\pi/(Fc\times Ts)$, where Fc denotes a frequency band width of a chunk, where the chunk is defined as consecutive Orthogonal Frequency Division Multiplexing (OFDM) symbols in a time domain and consecutive subcarriers in a frequency domain, Ts denotes a length of time for an OFDM symbol.

5. A base station apparatus for use in a communication system, the base station apparatus comprising:

a control circuit configured to and/or programmed to select a mode from a plurality of modes, the plurality of modes including at least a first mode to be capable of applying a phase rotation difference to signals between adjacent subcarriers at least in a transmitting antenna and a second mode not to be capable of applying the phase rotation difference, a transmitting circuit to and/or programmed to transmit, to a terminal apparatus, signals based on the mode selected, and a receiving circuit configured to and/or programmed to receive a Channel Quality Indicator (CQI) depending on the mode selected.

6. The base station apparatus according to claim 5, wherein a maximum value of the phase rotation difference to signals between adjacent subcarriers is larger than $2\pi(Fc+Ts)$, where Fc denotes a frequency band width of a chunk, where the chunk is defined as consecutive Orthogonal Frequency Division Multiplexing (OFDM) symbols in a time domain and consecutive subcarriers in a frequency domain, Ts denotes a length of time for an OFDM symbol.

7. A communication method of a base station apparatus for use in a communication system, the communication method comprising:

selecting a mode from a plurality of modes, the plurality of modes including at least a first mode to be capable of applying a phase rotation difference to signals between adjacent subcarriers at least in a transmitting antenna and a second mode not to be capable of applying the phase rotation difference, transmitting, to a terminal apparatus, signals based on the mode selected, and receiving a Channel Quality Indicator (CQI) depending on the mode selected.

8. The communication method according to claim 7, wherein a maximum value of the phase rotation difference to signals between adjacent subcarriers is larger than $2\pi(Fc+Ts)$, where Fc denotes a frequency band width of a chunk, where the chunk is defined as consecutive Orthogonal Frequency Division Multiplexing (OFDM) symbols in a time domain and consecutive subcarriers in a frequency domain, Ts denotes a length of time for an OFDM symbol.

* * * * *